US012584771B2

(12) United States Patent
Liu et al.

(10) Patent No.: US 12,584,771 B2
(45) Date of Patent: Mar. 24, 2026

(54) AERIAL VEHICLE

(71) Applicant: SZ DJI TECHNOLOGY CO., LTD., Shenzhen (CN)

(72) Inventors: Yifen Liu, Shenzhen (CN); Bo Wu, Shenzhen (CN); Chuanlu Zuo, Shenzhen (CN); Jian Yang, Shenzhen (CN); Xiang Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/020,564

(22) Filed: Jan. 14, 2025

(65) Prior Publication Data

US 2025/0153871 A1 May 15, 2025

Related U.S. Application Data

(63) Continuation of application No. PCT/CN2022/109265, filed on Jul. 29, 2022.

(51) Int. Cl.
G01D 18/00 (2006.01)
B64U 10/14 (2023.01)
(Continued)

(52) U.S. Cl.
CPC ............. G01D 18/00 (2013.01); B64U 10/14 (2023.01); B64U 20/87 (2023.01); B64U 30/296 (2023.01);
(Continued)

(58) Field of Classification Search
CPC ...... B64U 20/50; B64U 30/29; B64U 30/296; B64U 30/293; B64U 30/297; B64U 10/14; B64U 20/87
See application file for complete search history.

(56) References Cited

U.S. PATENT DOCUMENTS

| | | | | |
|---|---|---|---|---|
| 10,836,508 | B2 * | 11/2020 | Overall | ................. H04N 23/66 |
| 2009/0284644 | A1 * | 11/2009 | McKaughan | ........... G01C 3/08 |
| | | | | 348/E5.045 |

(Continued)

FOREIGN PATENT DOCUMENTS

| | | |
|---|---|---|
| CN | 203306225 U | 11/2013 |
| CN | 104853988 A | 8/2015 |

(Continued)

OTHER PUBLICATIONS

The World Intellectual Property Organization (WIPO) International Search Report for PCT/CN2022/109265 Apr. 18, 2023 6 Pages (including translation).

(Continued)

*Primary Examiner* — Joshua D Huson
*Assistant Examiner* — Peter A Taraschi
(74) *Attorney, Agent, or Firm* — Anova Law Group, PLLC

(57) ABSTRACT

An aerial vehicle includes a center body, two arm assemblies arranged at the center body, a power device, and a driver mechanism mechanically coupled to the arm assemblies. The power device includes two first and two second rotor power assemblies. Each pair of first and second rotor power assemblies are installed at two ends of an arm assembly. The driver mechanism drives the arm assemblies to move relative to the center body such that distal parts of the two arm assemblies move between first and second height positions. In a direction of a roll axis of the power device, the first rotor power assemblies are closer to an installation site on the center body than the second rotor power assemblies. When the distal parts are at the second height position, spacing between the first rotor power assemblies is larger than spacing between the second rotor power assemblies.

20 Claims, 33 Drawing Sheets

(51) Int. Cl.

| | | |
|---|---|---|
| *B64U 20/87* | (2023.01) | |
| *B64U 30/296* | (2023.01) | |
| *B64U 101/30* | (2023.01) | |
| *G05D 1/243* | (2024.01) | |
| *G05D 109/25* | (2024.01) | |
| *G05D 111/10* | (2024.01) | |
| *G06T 7/80* | (2017.01) | |

(52) U.S. Cl.

CPC .............. *G05D 1/243* (2024.01); *G06T 7/80* (2017.01); *B64U 2101/30* (2023.01); *G05D 2109/254* (2024.01); *G05D 2111/10* (2024.01)

(56) References Cited

U.S. PATENT DOCUMENTS

| | | | | |
|---|---|---|---|---|
| 2011/0017865 | A1 * | 1/2011 | Achtelik | ................ B64U 10/16 244/17.23 |
| 2014/0263823 | A1 * | 9/2014 | Wang | ................... B64U 30/293 244/17.23 |
| 2017/0075351 | A1 | 3/2017 | Liu | |
| 2021/0107636 | A1 * | 4/2021 | Seung | .................. B64U 30/293 |
| 2022/0355950 | A1 * | 11/2022 | Lukaczyk | ............ G03B 15/006 |

FOREIGN PATENT DOCUMENTS

| | | | | |
|---|---|---|---|---|
| CN | 105235899 | A | | 1/2016 |
| CN | 105416558 | A | | 3/2016 |
| CN | 206155784 | U | | 5/2017 |
| CN | 206265308 | U | * | 6/2017 |
| CN | 207078832 | U | | 3/2018 |
| CN | 207417151 | U | | 5/2018 |
| CN | 108248845 | A | | 7/2018 |
| CN | 111566011 | A | | 8/2020 |
| CN | 111661316 | A | | 9/2020 |
| CN | 212766731 | U | | 3/2021 |
| CN | 213323741 | U | | 6/2021 |
| CN | 113631480 | A | | 11/2021 |
| CN | 114787036 | A | | 7/2022 |
| WO | 2018076456 | A1 | | 5/2018 |

OTHER PUBLICATIONS

The World Intellectual Property Organization (WIPO) International Search Report and Written Opinion for PCT/CN2023/082913 Jun. 16, 2023 16 Pages (including translation).

* cited by examiner

6521

6521    65

6521

63 (64)    6521

6521

AERIAL VEHICLE

CROSS-REFERENCE TO RELATED APPLICATION

This application is a continuation of International Application No. PCT/CN2022/109265, filed on Jul. 29, 2022, the entire content of which is incorporated herein by reference.

TECHNICAL FIELD

The present disclosure generally relates to the field of aerial photographing technologies and, more particularly, to an aerial vehicle.

BACKGROUND

In the field of aerial photography, micro or small aerial vehicles are particularly suitable for performing photography, surveillance, reconnaissance, or other tasks in near-ground environments (such as indoors, urban areas, or jungles). Micro or small aerial vehicles can be equipped with functional loads, such as sensors for collecting environmental data or cameras for photographing.

A camera carried by an aerial vehicle can be used for framing or entering difficult-to-access environments for photographing to achieve functions such as rescue.

SUMMARY

In accordance with the disclosure, there is provided an aerial vehicle including a center body, two arm assemblies arranged at two opposite sides of the center body, respectively, a power device, and a driver mechanism mechanically coupled to the two arm assemblies. Each of the two arm assemblies includes a proximal part and a distal part, and the proximal part is closer to the center body than the distal part. The power device includes two first rotor power assemblies each installed at one end of one of the two arm assemblies and two second rotor power assemblies each installed at another end of one of the two arm assemblies. The driver mechanism is configured to drive the two arm assemblies to move relative to the center body to move the distal parts of the two arm assemblies between a first height position and a second height position different from the first height position. In a direction of a roll axis of the power device, the two first rotor power assemblies are closer to an installation site on the center body for installation of a load assembly than the two second rotor power assemblies. The two arm assemblies are configured such that when the distal parts of the two arm assemblies are at the second height position, a spacing between the two first rotor power assemblies is larger than a spacing between the two second rotor power assemblies.

BRIEF DESCRIPTION OF THE DRAWINGS

To more clearly illustrate the technical solutions of the embodiments of the present disclosure, the drawings needed for use in the description of the embodiments will be briefly introduced below. The drawings described below are some embodiments of the present disclosure. For those ordinary in the art, other drawings can be obtained based on these drawings without any creative work.

3                                                              4

Figure 26:
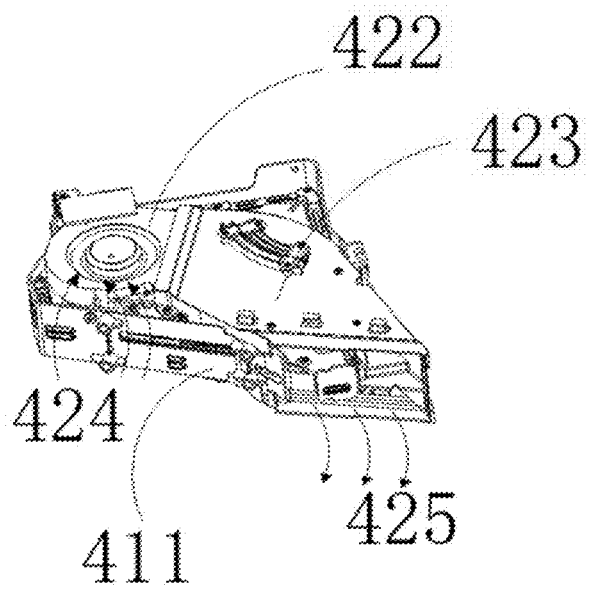
FIG. 26 is a schematic structural diagram of a second heat dissipation structure of the heat dissipation device shown in FIG. 22 and FIG. 23.
Figure 27:
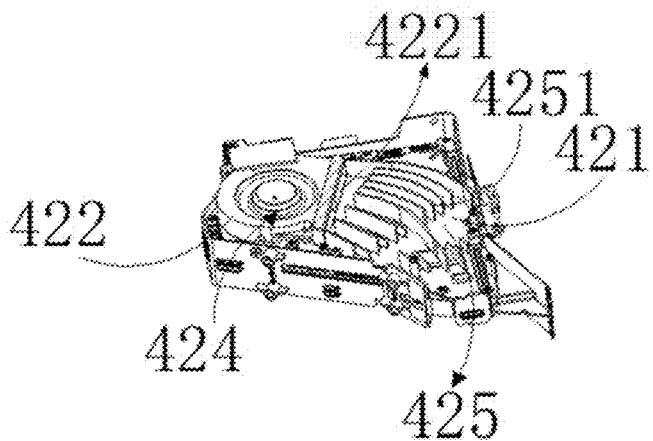

FIG. 27 is a schematic structural diagram of the second heat dissipation structure (without a second cover) shown in FIG. 26.

Figure 28:
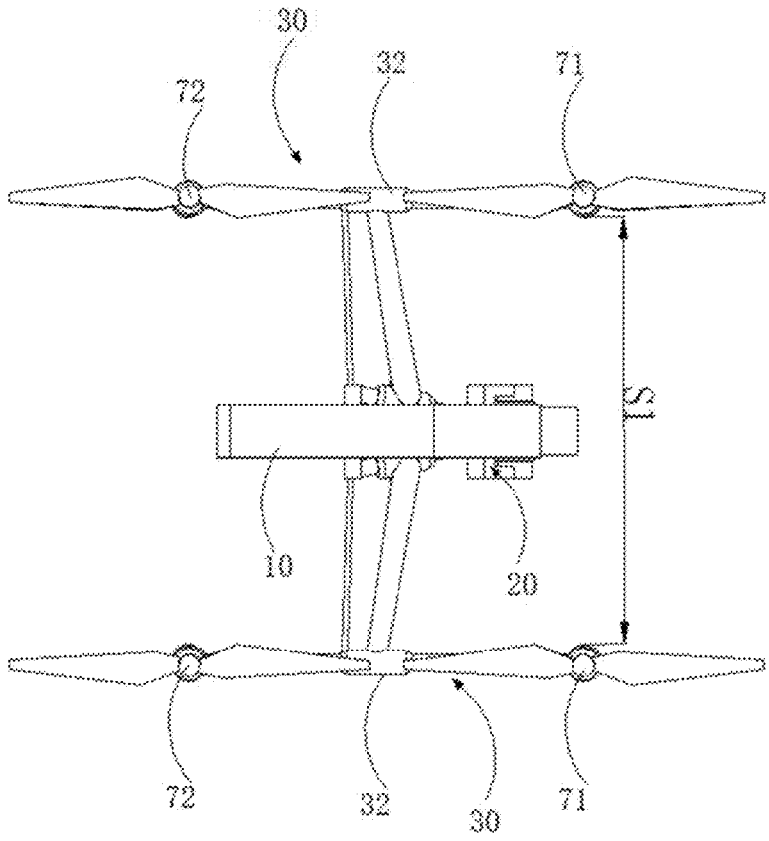

FIG. 28 is another three-dimensional structural diagram of an aerial vehicle when a distal part is at a first height position consistent with embodiments of the present disclosure.

Figure 29:
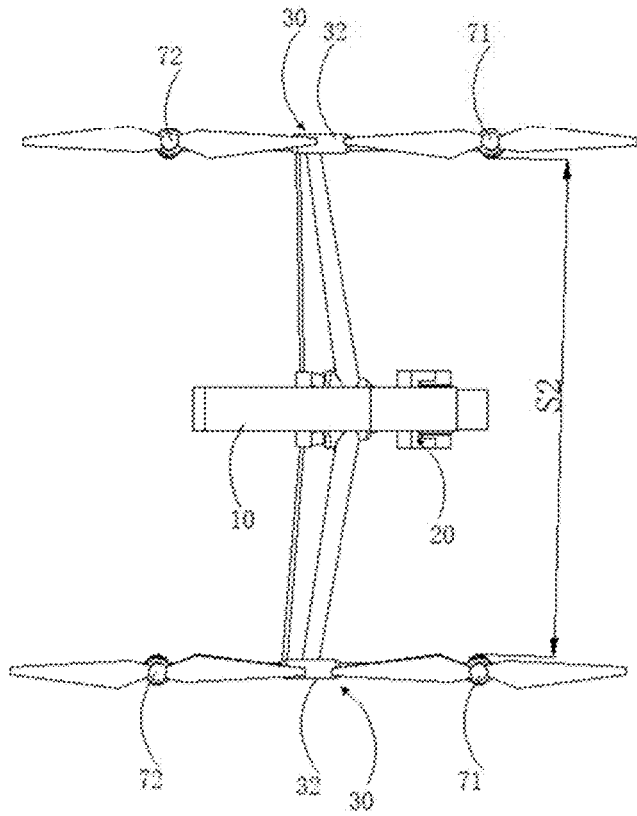

FIG. 29 is a top view of the aerial vehicle shown in FIG. 28 when the distal part is at a second height position.

Figure 30:
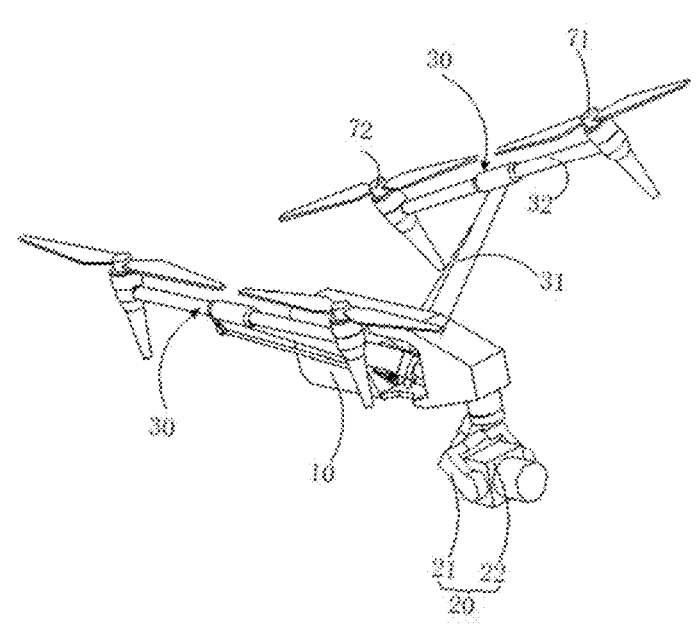

FIG. 30 is another three-dimensional structural diagram of an aerial vehicle when a distal part is at a first height position consistent with embodiments of the present disclosure.

Figure 31:
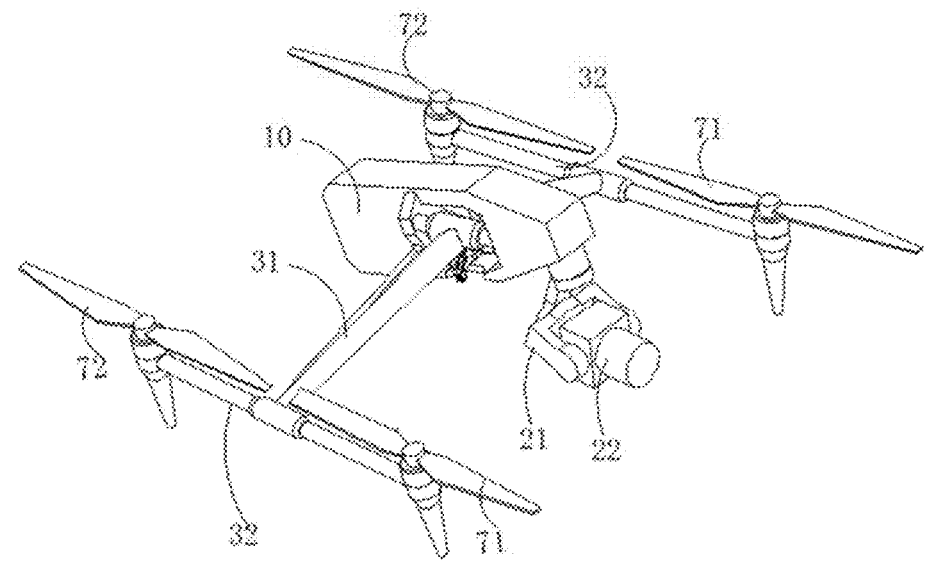

FIG. 31 is another three-dimensional structural diagram of an aerial vehicle when a distal part is at a second height position consistent with embodiments of the present disclosure.

Figure 32:
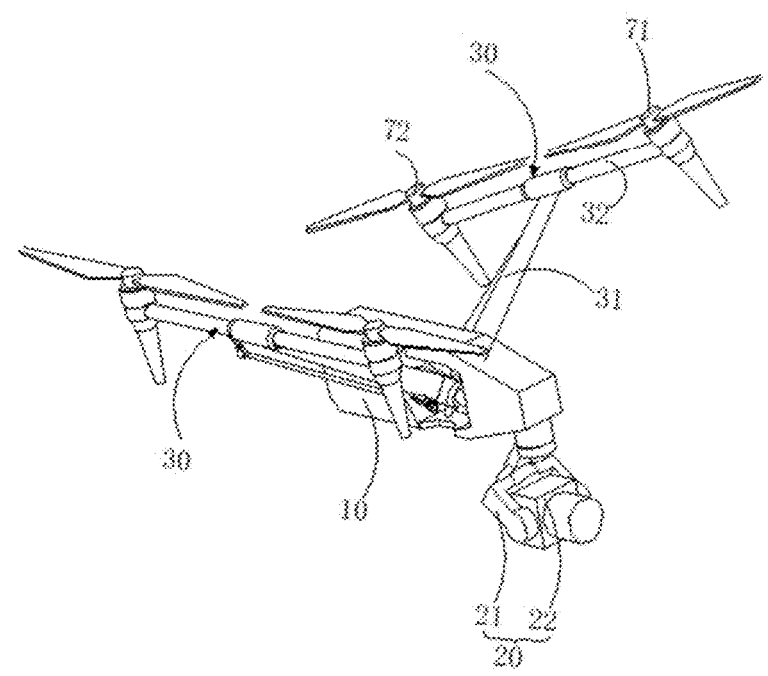

FIG. 32 is another three-dimensional structural diagram of an aerial vehicle when a distal part is at a first height position consistent with embodiments of the present disclosure.

Figure 33:
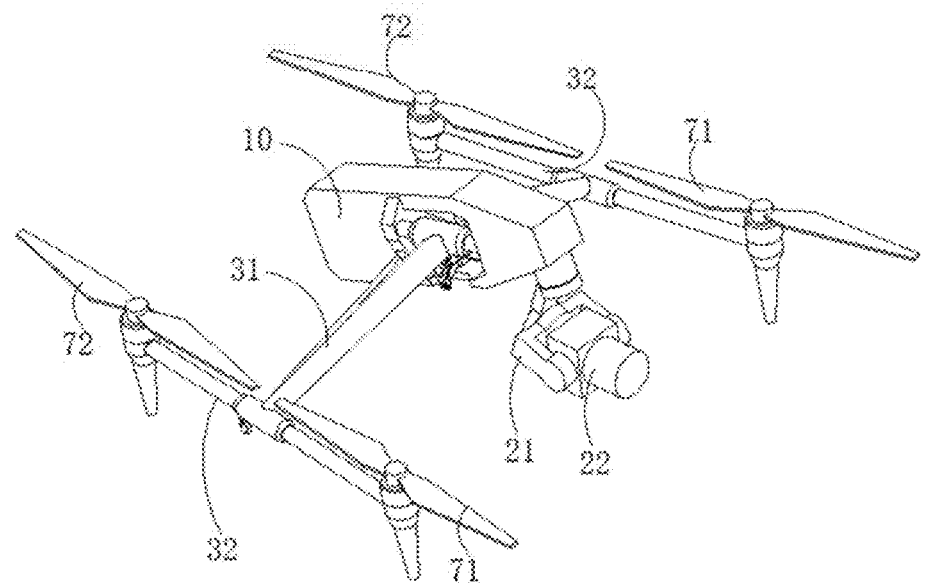

FIG. 33 is another three-dimensional structural diagram of an aerial vehicle when a distal part is at a second height position consistent with embodiments of the present disclosure.

REFERENCE NUMERALS

10—center body, 11—driver mechanism, 111—steering gear, 112—screw bar, 113—nut-connection bar mechanism, 12—rotation axis, 13—core bard, 14—air inlet, 15-accommodation port, 16—installation site
20—load assembly, 21—gimbal mechanism, 211—pitch axis motor, 212—roll axis motor, 213—yaw axis motor, 22—photographing device
30—arm assembly, 31—connection bar, 32—cross bar, 331—first arm assembly, 332—second arm assembly, 34—auxiliary arm, 35—first ball joint structure, 351—first ball head, 36—second ball joint structure, 361—second ball head, 362—pull bar connector, 3621—first assembly, 36211—first step member, 36212—slot, 3622—second assembly, 36221—second step member, 36222—rib, 36223—insertion member, 37—proximal part, 38—distal part, 39—leg
40—heat dissipation device, 41—first heat dissipation structure, 411—first bracket, 4111—first area, 4112—second area, 4113—cavity, 412—first fan, 4121—air outlet of first fan, 413—first cover plate, 414—first air inlet duct, 415—first air outlet duct, 4151—first heat dissipation rib, 42—second heat dissipation structure, 421—second bracket, 4211—third area, 4212—fourth area, 422—second fan, 4221—air outlet of second fan, 423—second cover plate, 424—second air inlet duct, 425—second air outlet duct, 4251—second heat dissipation rib, 4252—outlet of the second air outlet duct,
50—FPV photographing assembly, 51—installation bracket, 511—first end, 5111—driver installation slot, 512—second end, 5121—installation hole, 5122—guide inlet, 513—accommodation cavity, 514—first opening, 515—second opening, 52—FPV device, 521—main body, 522—protrusion, 523—shaft end, 53—driver element, 54—bearing, 55—cover,
61—first binocular, 611—first front visual sensor, 612—second front visual sensor, 62—second binocular, 621—first rear visual sensor, 622—second rear visual sensor, 63—third binocular, 64—fourth binocular,

65—visual bracket, 651—fixation frame, 652—press member, 6521—cantilever structure,
70—power device, 71—first rotor power assembly, 72—second rotor power assembly, 73—propeller, 74—motor, 75—motor seat, 751—installation member,
80—controller
90—detector, 91—Hall plate, 92—magnetic ring

DETAILED DESCRIPTION OF THE EMBODIMENTS

To make the purpose, technical solution, and advantages of the embodiments of the present disclosure clearer, the technical solution in the embodiments of the present disclosure will be described below in conjunction with the drawings in the embodiments of the present disclosure. Obviously, the described embodiments are some of the embodiments of the present application, not all of the embodiments. Based on the embodiments in the present disclosure, all other embodiments obtained by those skilled in the art without creative work are within the scope and protection of the present disclosure.

In the present disclosure, the terms such as "first" or "second" are only used to facilitate the description of different components, and cannot be understood as indicating or implying a sequential relationship, relative importance, or implicitly indicating the number of technical features indicated. Therefore, the features associated with "first" and "second" may explicitly or implicitly include at least one of the features.

The pitch axis of the power device of the present disclosure runs from one side of the power device to the other side (such as from the left side to the right side, or from the right side to the left side); the yaw axis runs from the top of the power device to the bottom, or from the bottom to the top; the roll axis runs from the front of the power device to the rear, or from the rear to the front. The pitch axis, the yaw axis, and the roll axis are mutually orthogonal to each other.

Unless otherwise defined, all technical and scientific terms used in the present disclosure have the same meaning as those skilled in the art in the technical field of the present disclosure. The terms used in the present disclosure are only for the purpose of describing specific embodiments, and are not intended to limit the scope of the present disclosure.

The technical solutions in the embodiments of the present disclosure will be described below in conjunction with the drawings in the embodiments of the present application. In the absence of conflict, the following embodiments and features in the embodiments can be combined with each other. Obviously, the described embodiments are only a part of the embodiments of the present application, rather than all the embodiments. Based on the embodiments in the present disclosure, all other embodiments obtained by those skilled in the art without creative work are within the scope of the present disclosure.

In the field of aerial photography, micro or small aerial vehicles are particularly suitable for performing tasks such as photography, surveillance, or reconnaissance in near-ground environments (such as indoors, urban areas, and jungles, etc.). Micro or small aerial vehicles may be equipped with functional loads, such as sensors for collecting environmental data or camera modules for photographing. In existing aerial vehicles, there is a problem that the load assembly is blocked by the power device when working, which affects the operation.

Figure 1:
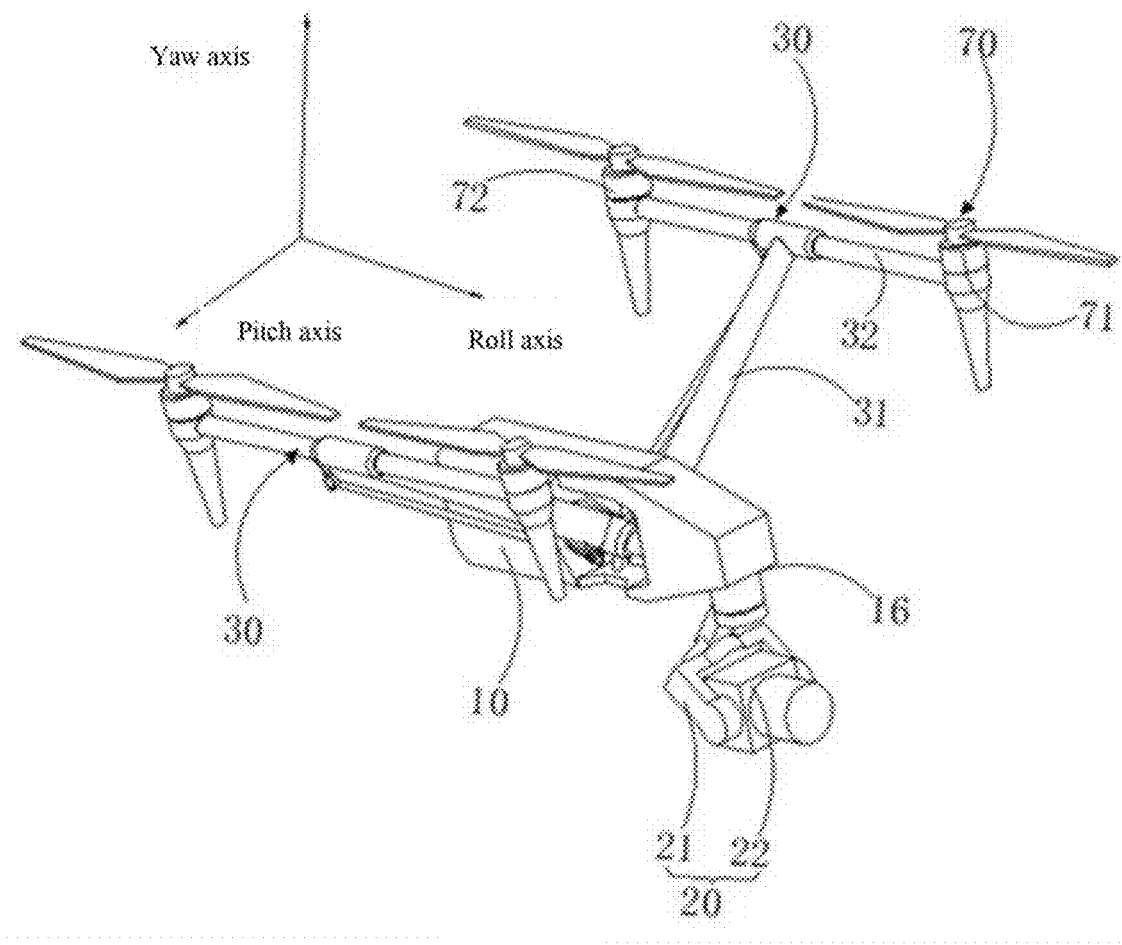
FIG. 1 is a three-dimensional structural diagram of an aerial vehicle when a distal part is at a first height position consistent with embodiments of the present disclosure.
Figure 2:
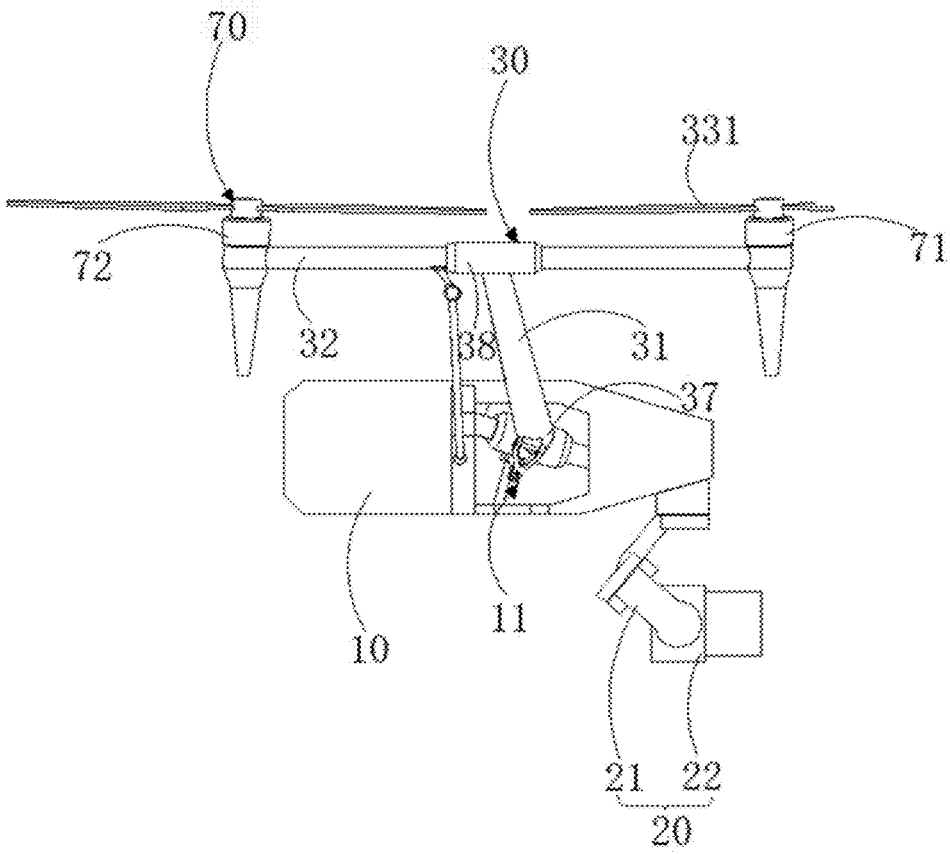
FIG. 2 is a side view of the aerial vehicle shown in FIG. 1.
Figure 3:
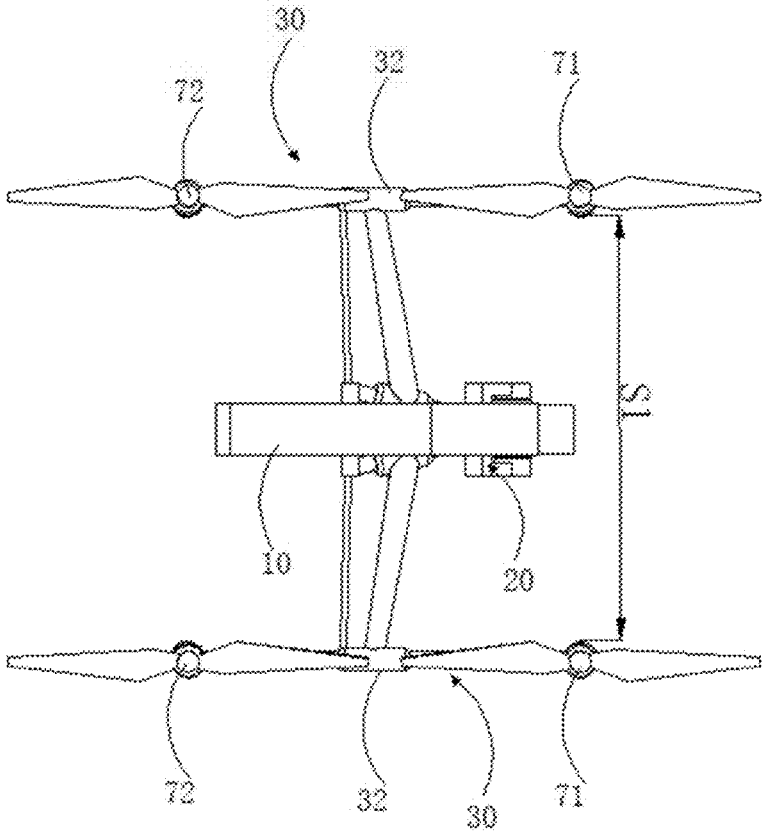
FIG. 3 is a top view of the aerial vehicle shown in FIG. 1.
Figure 4:
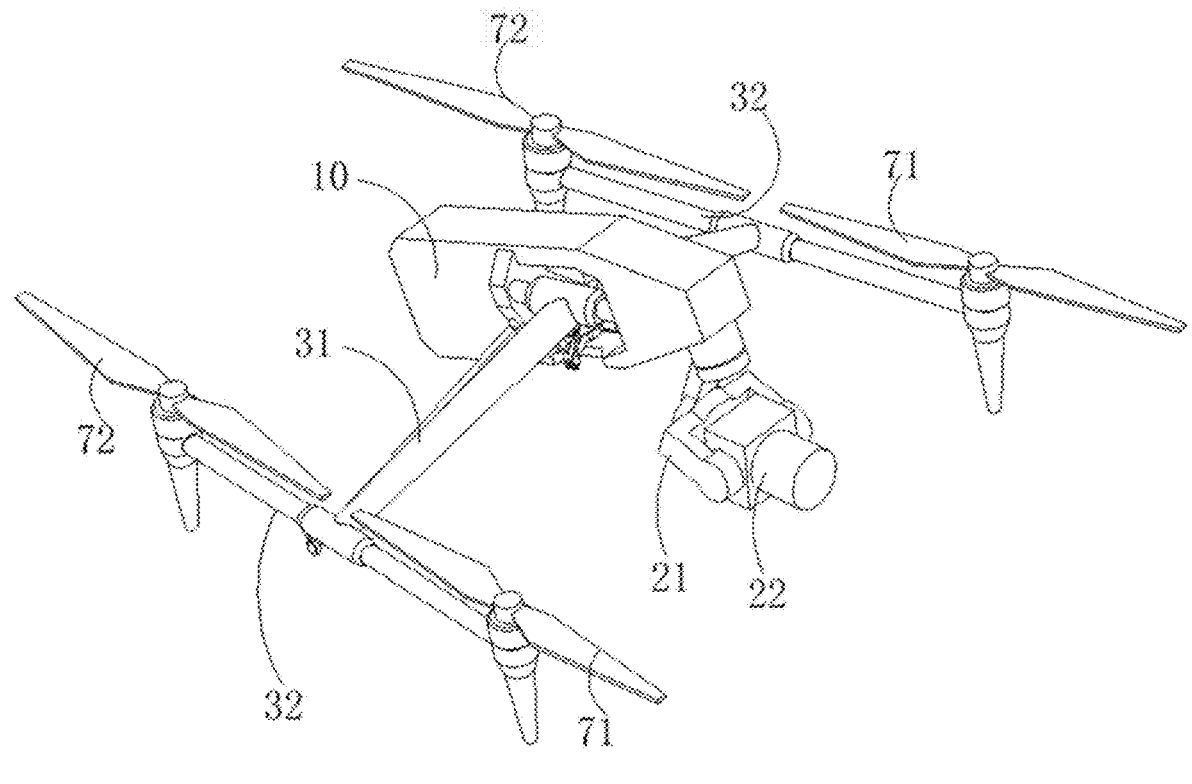
FIG. 4 is a three-dimensional structural diagram of an aerial vehicle when a distal part is at a second height position consistent with embodiments of the present disclosure.
Figure 5:
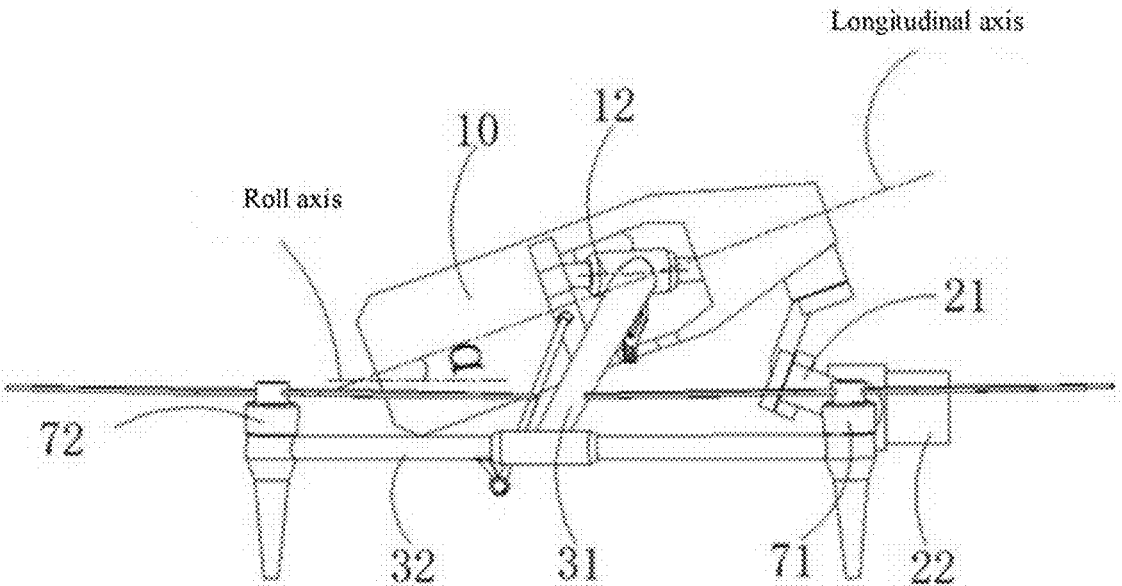
FIG. 5 is a side view of the aerial vehicle shown in FIG. 4.
Figure 6:
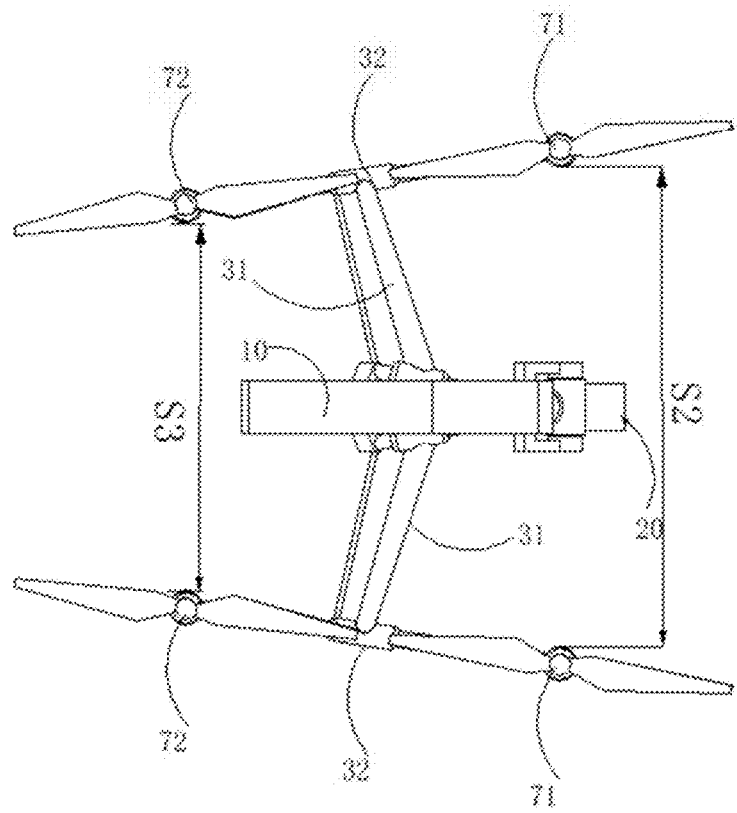
FIG. 6 is a top view of the aerial vehicle shown in FIG. 4.

The present disclosure provides an aerial vehicle with an effectively increased operation space for a load assembly. As shown in FIG. 1 to FIG. 6, in one embodiment, the aerial vehicle includes: a center body 10, a driver mechanism 11, a power device 70 for moving the aerial vehicle, and two arm assemblies 30. The two arm assemblies 30 are respectively arranged at two opposite sides of the center body 10. Each arm assembly 30 is provided with a proximal part 37 close to the center body 10 and a distal part 38 away from the center body 10. The power device 70 includes first rotor power assemblies 71 respectively mounted at the two arm assemblies 30. The driver mechanism 11 is mechanically coupled with the two arm assemblies 30. When the aerial vehicle is in a flying state, the driver mechanism 11 is able to drive the two arm assemblies 30 to move relative to the center body 10, such that the distal part 38 is stably maintained at a first height position (as shown in FIG. 1 to FIG. 3) or a second height position (as shown in FIG. 4 to FIG. 6), that is, the distal part 38 is at the first height position at one end of a preset rotation stroke or the second height position at the other end. The second height position is different from the first height position. The spacing S1 (as shown in FIG. 3) between the first rotor power assemblies 71 of the two arm assemblies 30 when the distal part 38 is at the first height position is smaller than the spacing S2 (as shown in FIG. 6) when the distal part 38 is at the second height position.

In the present embodiment, the arm assemblies 30 may rotate in the preset rotation stroke to achieve deformation of the aerial vehicle. When the load assembly 20 is set on the aerial vehicle, the functional space of the load assembly 20 (usually arranged at the center body 10) may be increased. For example, when the distal part 38 is at a position far away from the load assembly 20, the load assembly 20 may operate in a way around itself. For example, when the load assembly 20 is an imaging device, the imaging device may rotate around the yaw axis direction of the gimbal for photographing without obstruction. When the load assembly 20 is a glass cleaning assembly, a nozzle assembly, or a disinfection assembly, etc., the operation space may be provided for the circumferential operation of the load assembly 20. When the distal part 38 is at a position close to the load assembly 20, the arm assemblies 30 may be pulled closer in the height direction, reducing the probability of the rotor power assemblies on the arm assemblies 30 entering the operation range of the load assembly 20. Therefore, the load assembly 20 may have a larger operation space for the upward/downward operations. Exemplarily, when the load assembly 20 is an imaging device, the imaging device may photograph around the pitch axis of the gimbal. Since the field of view (FOV) of the photographing device 22 radiates outward from the lens, the rotor power assemblies farther away from the photographing device 22 may be more likely to enter the FOV. When the distance is shortened, the rotor power assemblies may be prevented from entering the FOV. The same principle may apply to the glass cleaning assembly that rotates up and down or the nozzle assembly that rotates up and down to spray. The load assembly 20 of the present disclosure is not limited to the above examples. Those skilled in the art may install the load assembly 20 with certain functions on the center body 10 according to actual needs, such as sensors, transmitters, tools, instruments, manipulators, or other functional devices. In addition, the aerial vehicle provided by the present disclosure may exist independently of the load assembly 20, or it may include the load assembly 20.

Further, during the upward/downward deformation of the arm assemblies 30, the lateral spacing between the first rotor power assemblies 71 of the two arm assemblies 30 may further change, for example, the lateral spacing may increase, such that the spacing between the load assembly 20 and the first rotor power assemblies 71 increases, thereby further increasing the functional space or operation space of the load assembly 20. In the present disclosure, the second height position may be a height position farther from the load assembly 20 or a height position closer to the load assembly 20. Similarly, the first height position may be also the same. Regardless of whether the distal part 38 is at a height position closer to the load assembly 20 or a height position farther away, increasing the lateral spacing of the rotor power assemblies at this time may increase the operation space of the load assembly 20 in the upward/downward direction.

In one embodiment, the center body 10 may be provided with an installation site 16 for mounting the load assembly 20. In the yaw axis direction of the power device 70, the second height position may be closer to the load assembly 20 than the first height position. That is, at a height position closer to the load assembly 20, the lateral spacing of the first rotor power assemblies 71 may increase, which may further ensure that the operation space of the load assembly 20 when working upward or downward is increased. When the load assembly 20 needs to work in the upward/downward direction, the distal part 38 may be pulled closer. Under this configuration, the lateral spacing may be further expanded, which is conducive to increasing the operation space. Of course, this does not exclude that when the distal part 38 is at the farther height position, those skilled in the art may also increase the lateral spacing of the first rotor power assemblies 71, since, under this configuration, the operation space may also be increased when it is also necessary to work in the upward/downward direction.

Another embodiment of the present disclosure provides another aerial vehicle. The aerial vehicle may include: a center body 10, which is configured to be used to connect a load assembly 20; two arm assemblies 30 respectively arranged at two opposite sides of the center body 10, each of which is provided with a proximal part 37 close to the center body 10 and a distal part 38 away from the center body 10; a power device 70 for moving the aerial vehicle, including a first rotor power assembly 71 installed at each of the two arm assemblies 30; a driver mechanism 11, which is mechanically coupled with the two arm assemblies 30 and drives the two arm assemblies 30 to move relative to the center body 10 when the aerial vehicle is in the flying state, such that the distal part 38 is stably maintained at a first height position or a second height position. The first height position may be located above the load assembly 20, and in the yaw axis direction of the power device 70, the second height position may be closer to the load assembly 20 than the first height position.

The aerial vehicle may have a first working mode and a second working mode, and the first working mode and the second working mode may be switched according to user selection. When the aerial vehicle is in the first working mode, the distal part 38 may be located at the first height position, such that the load assembly 20 is able to rotate around the vertical direction without obstruction at least when the propeller plane of the power device 70 is in a horizontal state. When the aerial vehicle is in the second working mode, the distal part 38 may be located at the second height position, and the spacing between the first rotor power assemblies 71 of the two arm assemblies 30 may be increased compared to the first height position, such that the load assembly 20 is able to operate in the upward/downward direction without obstruction at least when the propeller plane of the power device is in a horizontal state.

In the present embodiment, when the distal part 38 is located at the first height position, because of the large distance from the load assembly 20, the load assembly 20 may not be disturbed when rotating around the vertical direction. When the distal part 38 is located at the second height position, the spacing between the first rotor power assemblies 71 of the two arm assemblies 30 may be increased compared to the first height position, and the spacing may be set according to actual needs, such that the load assembly 20 is able to operate in the upward/downward direction without obstruction.

In one embodiment, the load assembly 20 may include a gimbal mechanism 21, and the gimbal mechanism 21 may be configured to drive the photographing device 22 to rotate to adjust the photographing angle.

In one embodiment, when the distal part 38 is located at the first height position, because of the large distance from the load assembly 20, the load assembly 20 may not photograph the center body 10 and the power device 70 when rotating 360° around the vertical direction (the yaw axis of the gimbal mechanism 21), and the 360° yaw (yaw axis) working mode may be realized. At this time, when the photographing device 22 needs to photograph upward or photograph horizontally with the center body 10 flying forward with a large attitude, part of the field of view may be blocked by the propellers 73 of the power device 70. Therefore, the arm assemblies 30 may be designed to perform deformation movement, such that the vertical distance between the power device 70 and the load assembly 20 is shortened when the distal part 38 rotates to the second height position. Therefore, when the photographing device 22 photographs upward, the probability of the propellers 73 entering the FOV (Field of View) of the photographing device 22 is reduced. Further, the spacing between the first rotor power assemblies 71 of the two arm assemblies 30 may be larger than that at the first height position, and the spacing may be set according to actual needs, such that the FOV of the photographing device 22 when photographing upward is staggered with the propellers 73. Therefore, the photographing device 22 may be able to fully photograph the sky in an unobstructed upward photographing mode. In addition, there may be no mechanical interference between the load assembly 20 and the propellers 73, ensuring that the rotating blades do not hit the photographing device 22.

In summary, in the embodiments of the present disclosure, the arm assemblies 30 may be deformed such that the load assembly 20 has both a 360° yaw photographing mode and an upward photographing mode. In both photographing modes, unobstructed photographing may be achieved, which solves the long-standing problem of unmanned aerial vehicles being blocked and greatly improves the photographing quality.

In one embodiment, the load assembly 20 may be arranged at the front end (head) position of the center body 10 and located below the center body 10. In other embodiments, the load assembly 20 may also be arranged at the rear tail, or above the center body 10. The load assembly 20 may be arranged at any position of the center body 10 according to actual needs. Below, the embodiments with the load assembly 20 being arranged at the head and below the center body 10 will be used as examples to illustrate the present disclosure, and do not limit the scope of the present disclosure. Those skilled in the art may adjust the position of the load assembly 20 according to actual needs and adaptively adjust the setting method of the arm assemblies 30.

Figure 10:
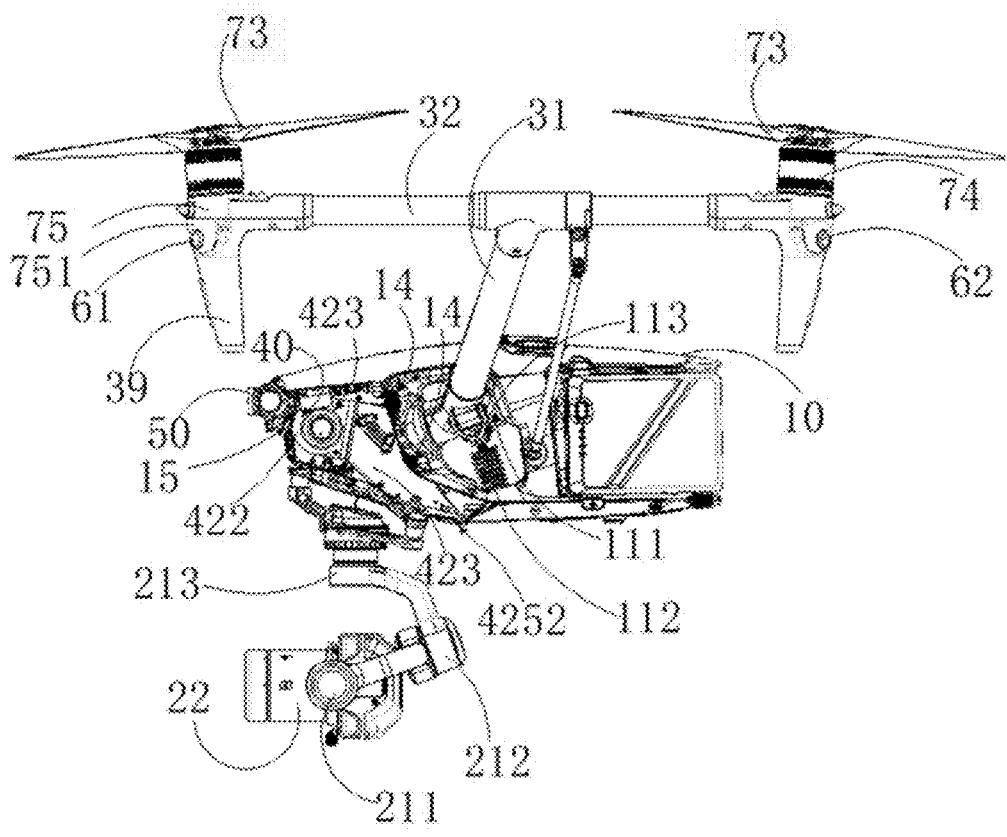
FIG. 10 is a schematic structural diagram of another aerial vehicle consistent with embodiments of the present disclosure, where a partial shell of a center body is hidden and an internal heat dissipation structure is shown.

In one embodiment, as shown in FIG. 10, the gimbal mechanism 21 includes a yaw axis motor 213, a roll axis motor 212, and a pitch axis motor 211, arranged in sequence from the center body 10 to the photographing device 22. The axis of the roll axis motor 212 may be tilted relative to the axis of the pitch axis motor 211 or the axis of the yaw axis motor 213, and the axis of the roll axis motor 212 may gradually move away from the center body 10 in the direction toward the photographing device 22, such that the photographing device 22 is able to photograph more angles upward.

As shown in FIG. 1 to FIG. 6, in one embodiment, the power device 70 further includes second rotor power assemblies 72 respectively mounted at the two arm assemblies 30. The first rotor power assemblies 71 and the second rotor power assemblies 72 may be respectively arranged at the two ends of the arm assemblies 30 (referring to the two ends along the roll axis direction of the power device), forming at least a quadcopter, which may adapt to flight conditions of various speeds and various flight routes.

In the roll axis direction of the power device 70, the first rotor power assemblies 71 may be close to the installation site 16 on the center body 10 for mounting the load assembly 20, that is, the first rotor power assemblies 71 may be close to the load assembly 20, to ensure that the lateral spacing of the first rotor power assemblies 71 closer to the load assembly 20 is adaptively adjusted during the deformation process, reducing or even eliminating the impact on the load assembly 20.

In one embodiment, the installation site 16 may be located at the lower side of the center body 10, that is, the load assembly 20 may be arranged at the lower side of the center body 10. The first height position may correspond to an upper position with respect to the center body 10, and the second height position may correspond to a lower position with respect to the center body 10. The upper position may refer to a position approximately same as a position of the upper part of the center body 10 in the height direction or a position above the center body 10, and the lower position may refer to a position approximately same as a position of the lower part of the center body 10 in the height direction or a position below the center body 10. Further, the installation site 16 may be located at the front side of the center body 10, that is, the load assembly 20 may be arranged at the front side of the center body 10.

In other embodiments, the load assembly 20 may also be arranged at the rear tail of the center body 10, or above the center body 10. The load assembly 20 may be arranged at any position of the center body 10 according to actual needs. Below, the embodiments with the load assembly 20 being arranged at the front head and the lower side of the center body 10 will be used as examples to illustrate the present disclosure, and do not limit the scope of the present disclosure. Those skilled in the art may adjust the position of the load assembly 20 according to actual needs, and adaptively adjust the setting mode of the arm assemblies 30.

In one embodiment, as shown in FIG. 2 and FIG. 3, when the distal part 38 is at the first height position, the spacing between the first rotor power assemblies 71 of the two arm assemblies 30 is equal to the spacing between the second rotor power assemblies 72, to form a symmetrical rotor power structure.

As shown in FIG. 5 and FIG. 6, when the distal part 38 is at the second height position, the spacing S2 between the first rotor power assemblies 71 of the two arm assemblies 30 is larger than the spacing S3 between the second rotor power assemblies 72. In other words, when the arm assemblies 30 turn from the first height position to the second height position, the spacing between the first rotor power assemblies 71 may increase, and the spacing between the second rotor power assemblies 72 may decrease, such that the arm assemblies 30 have a rotation similar to that around the yaw axis, increasing the spacing between the first rotor power assemblies 71. The structural design may be ingenious and simple.

In another embodiment, when the distal part 38 is at the second height position, the spacing between the first rotor power assemblies 71 of the two arm assemblies 30 may also be equal to the spacing between the second rotor power assemblies 72, that is, the four rotor assemblies of the two arm assemblies 30 may be in a parallel or approximately parallel state. As shown in FIG. 28 and FIG. 29, when the distal part 38 is at the first height position, the spacing S1 between the first rotor power assemblies 71 of the two arm assemblies 30 may be equal to the spacing between the second rotor power assemblies 72. When the distal part 38 is at the second height position, the spacing S2 between the first rotor power assemblies 71 of the two arm assemblies 30 may also be equal to the spacing between the second rotor power assemblies 72. S2 may be larger than S1.

In some other embodiments, as shown in FIG. 30, when the distal part 38 is at the first height position, the spacing between the first rotor power assemblies 71 of the two arm assemblies 30 is larger than the spacing between the second rotor power assemblies 72, that is, the arm assemblies 30 on two sides is in a V shape. As shown in FIG. 31, when the distal part 38 is at the second height position, the spacing between the first rotor power assemblies 71 of the two arm assemblies 30 is also equal to the spacing between the second rotor power assemblies 72, that is, the two arm assemblies 30 is in a parallel or approximately parallel state.

In yet some other embodiments, as shown in FIG. 32, when the distal part 38 is at the first height position, the spacing between the first rotor power assemblies 71 of the two arm assemblies 30 is larger than the spacing between the second rotor power assemblies 72, that is, the arm assemblies 30 on two sides is in a V shape. As shown in FIG. 33, when the distal part 38 is at the second height position, the spacing between the first rotor power assemblies 71 of the two arm assemblies 30 is also larger than the spacing between the second rotor power assemblies 72, that is, the two arm assemblies 30 also forms a V shape.

In another embodiment, as shown in FIG. 1 to FIG. 6, the aerial vehicle includes: a center body 10; two arm assemblies 30 respectively arranged at two opposite sides of the center body 10, each arm assembly 30 of which is provided with a proximal part 37 connected to the center body 10 and a distal part 38 away from the center body 10; a power device 70 for moving the aerial vehicle, which is arranged at the arm assemblies 30; and a driver mechanism 11, which is mechanically coupled with the two arm assemblies 30. When the aerial vehicle is in the flying state, the driver mechanism 11 may drive the two arm assemblies 30 to move relative to the center body 10, such that the distal part 38 is stably maintained at the first height position or the second height position. The second height position may be different from the first height position.

When the distal part 38 rotates between the first height position and the second height position, that is, during the rotation of the arm assemblies 30, the angle between a longitudinal axis of the center body 10 and the roll axis of the power device 70 may change, such that the longitudinal axis of the center body 10 is parallel to the roll axis of the power device 70 (as shown in FIG. 2) or tilted (as shown in FIG. 5), thereby changing the position of the load assembly 20 on the center body 10 relative to the power device 70 and then adjusting the operation space of the load assembly 20. The angle of the center body 10 relative to the power device 70 may be also adjusted, such that the aerial vehicle has less air resistance when flying and achieves a faster speed. This embodiment may exist alone, or it can be combined with the features of other embodiments of the present disclosure. In this disclosure, the longitudinal axis of the center body 10 refers to, for example, an axis from one end of the center body 10 that is closer to the gimbal mechanism 21 to another end of the center body 10 that is farther away from the gimbal mechanism 21, i.e., a roll axis of the center body 10, such as the axis shown and marked in FIG. 5.

As shown in FIG. 2, when the distal part 38 is at the first height position, the longitudinal axis of the center body 10 is parallel or approximately parallel to the roll axis of the power device 70 (such as the angle between the two is within the range of ±5°).

As shown in FIG. 5, when the distal part 38 is at the second height position, the longitudinal axis of the center body 10 is inclined relative to the roll axis of the power device 70, and one end of the center body 10 configured to connect the load assembly 20 is higher than the other end. In this form, when the propeller plane of the power device 70 (the plane formed by the lines connecting the center points of the rotating shafts of each rotor power assembly) is parallel to the horizontal plane, the end of the center body 10 close to the load assembly 20 may be higher than the end of the center body 10 away from the load assembly 20. The purpose of this setting is to lift the load assembly 20 upwards, such that the optical center of the camera is close to the first rotor power assemblies 71 in the yaw axis direction of the power device 70. That is, the aerial vehicle may tilt backward with the load assembly 20 at a certain angle, such that the load assembly 20 is able to rotate upwards at a certain angle relative to the horizontal plane when the aerial vehicle is hovering, thereby increasing the operation space. Further, the distance between the load assembly 20 lifted upwards and the first rotor power assemblies 71 may be smaller, which may further reduce or eliminate the interference of the power device 70 with the operation of the load assembly 20.

In addition, the inclined center body 10 may make the center body 10 tilt downwards from the front to the back when the aerial vehicle is flying forward with its head down, and may have a relatively small frontal area. The air resistance may be smaller when flying forward, and a faster speed may be achieved.

To facilitate the description of the working principle of the present disclosure, the form where the propeller plane of the power device 70 is in the horizontal state is used as an example to illustrate the present disclosure. In fact, no matter what attitude the power device 70 is in, such as forward tilt, backward tilt, left tilt, right tilt, etc., it does not affect the realization of the technical principle and technical effect of the present disclosure.

When the distal part 38 is located at the second height position, the longitudinal axis of the center body 10 may be inclined relative to the roll axis of the power device 70. That is, the roll axis may be parallel or approximately parallel to the horizontal plane, the longitudinal axis of the center body 10 may be tilted relative to the horizontal plane, and the center body 10 may be in a head-up state; or, the roll axis may be tilted relative to the horizontal plane, the center body 10 may be parallel or approximately parallel to the horizontal plane; or, the roll axis may be tilted relative to the horizontal plane, and the longitudinal axis of the center body 10 may be tilted relative to the horizontal plane. To obtain a better functional space, the attitude of the aerial vehicle may generally be controlled such that the roll axis of the power device 70 is in a horizontal state, and the center body 10 is in a head-up state.

In one embodiment, when the distal part 38 is located at the second height position, the angle α between the longitudinal axis of the center body 10 and the roll axis of the power device 70 may be any angle between 0° and 90°, for example, 18°, 19°, 20°, 25°, etc., which may achieve a better unobstructed photographing effect. For example, the angle may be set to 20°, that is, when the aerial vehicle is in the hovering state, the center body 10 may tilt back 20°, thereby driving the load assembly 20 to tilt back 20° as a whole. Those skilled in the art may set the angle to other angles according to actual needs.

Figure 8:
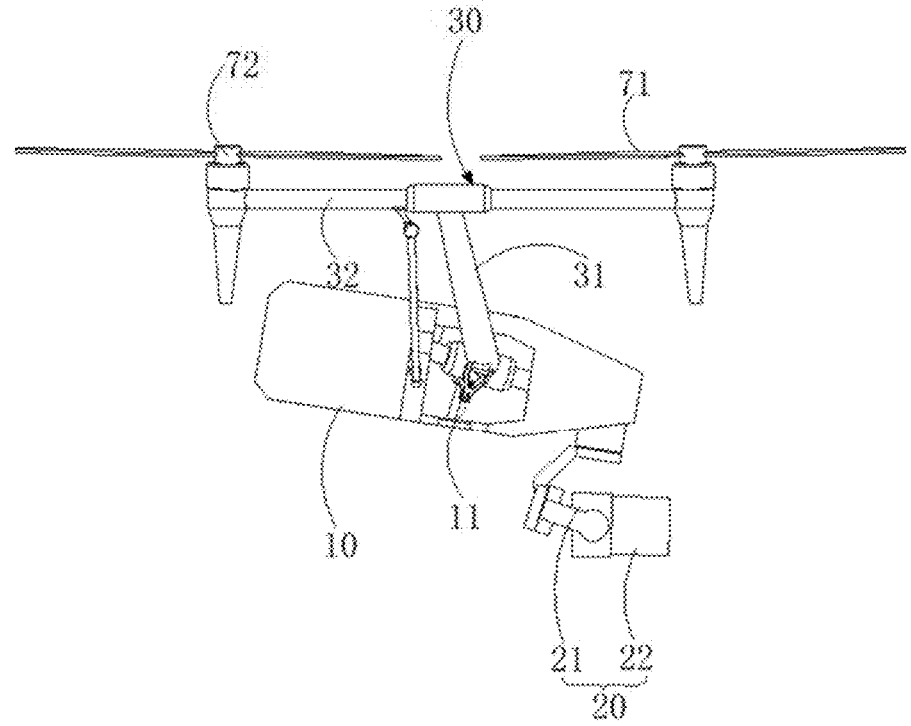
FIG. 8 is a side view of another aerial vehicle when a distal part is at a first height position consistent with embodiments of the present disclosure.
Figure 9:
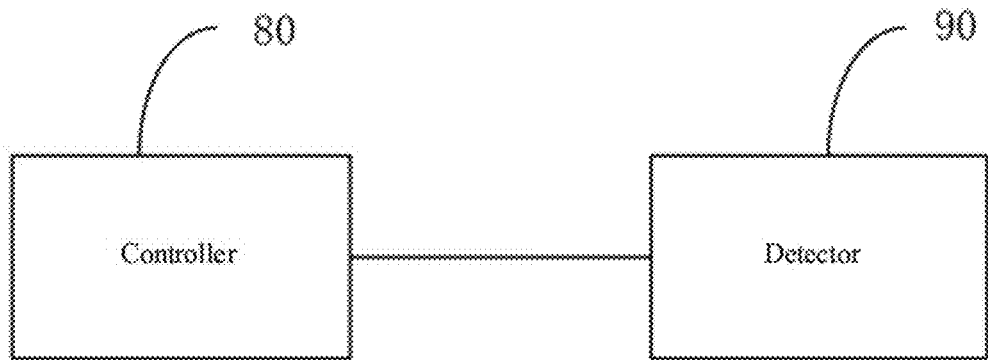
FIG. 9 is a schematic structural diagram of a controller and a detector consistent with embodiments of the present disclosure.

In another embodiment shown in FIG. 8, when the distal part 38 is located at the first height position, it is also set as follows: the longitudinal axis of the center body 10 is inclined relative to the roll axis of the power device 70, and the center body 10 configured to connect one end of the load assembly 20 is lower than the other end. That is, when the propeller plane of the power device is parallel to the horizontal plane, the end of the center body 10 close to the load assembly 20 may be lower than the end of the center body 10 away from the load assembly 20. In this way, the load assembly 20 may have a lower position, which may further prevent the power device 70 from interfering with the load assembly 20. The relative relationship between the longitudinal axis of the center body 10 and the roll axis of the power device 70 may be set according to actual needs (actual aerial vehicle attitude), and is not limited to the examples in the present disclosure. When the distal part 38 is located at the first height position, the longitudinal axis of the center body 10 may be inclined or parallel to the roll axis of the power device 70. When the distal part 38 is located at the second height position, the longitudinal axis of the center body 10 may be inclined or parallel to the roll axis of the power device 70. The state of the center body 10 (whether it is tilted relative to the roll axis of the power device 70) and the state of the arm assemblies 30 (whether they are in a V-shaped state or in a parallel state) may be arbitrarily combined.

To facilitate the description of the working principle of the present disclosure, the form where the propeller plane of the power device 70 is parallel to the horizontal plane is used as an example to illustrate the present disclosure. In various embodiments, the embodiments of the present disclosure may be applied to any attitude of the power device 70.

In one embodiment as shown in FIG. 1 to FIG. 6, one arm assembly 30 includes a connection bar 31 and a cross bar 32. One end of the connection bar 31 may be rotatably connected to the center body 10, and the other end may be connected to the cross bar 32. The two ends of the cross bar 32 may be a first end and a second end, and the first rotor power assemblies 71 may be arranged at the first end, or the first rotor power assemblies 71 may be arranged at the cross bar 32 and close to the first end. As shown in FIG. 3 and FIG. 6, the spacing between the first ends of the cross bars 32 of the two arm assemblies 30 when the distal part 38 is at the first height position may be smaller than the spacing when the distal part 38 is at the second height position.

In one embodiment, in the arm assembly 30, the proximal part 37 may be a position where the connection bar 31 is connected to the center body 10, and the distal part 38 may be the cross bar 32. Those skilled in the art may set the corresponding frame structure according to actual needs, such as not setting the cross bar 32, directly setting the connection bar 31, setting the rotor power assembly on the connection bar 31, etc. At this time, the proximal part 37 and the distal part 38 may be selected according to actual conditions.

Further, when the distal part 38 is at the first height position, the cross bars 32 of the two arm assemblies 30 may be parallel or approximately parallel. When the distal part 38 is at the second height position, the spacing between the first ends of the cross bars 32 of the two arm assemblies 30 may be larger than the spacing between the second ends, thereby increasing the operation space for the load assembly 20.

When the distal part 38 is at the second height position, the longitudinal axis of the center body 10 may be inclined relative to the plane formed by the cross bars 32 of the two arm assemblies 30, and one end of the center body 10 for connecting the load assembly 20 may be higher than the other end. The purpose of such a setting may be to lift the load assembly 20 upward, such that the optical center of the camera is close to the first rotor power assemblies 71 in the yaw axis direction of the power device 70. That is, the aerial vehicle may tilt backward with the load assembly 20 at a certain angle, such that the load assembly 20 is able to rotate upward at a certain angle relative to the horizontal plane when the aerial vehicle is hovering, thereby increasing the operation space. Further, the distance between the load assembly 20 lifted upward and the first rotor power assemblies 71 may be smaller, which may further reduce or eliminate the interference of the power device 70 with the operation of the load assembly 20.

When the distal part 38 is at the first height position, the longitudinal axis of the center body 10 may be parallel or approximately parallel to the cross bars 32 (the angle between the two is within the range of ±5°).

Figure 7:
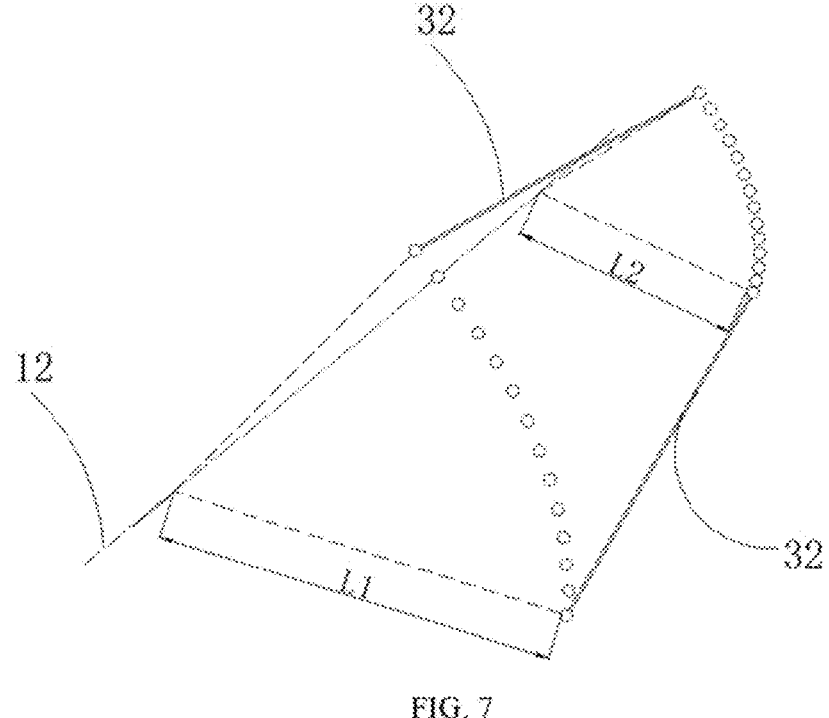
FIG. 7 is a schematic diagram showing a rotation trajectory of a cross bar consistent with embodiments of the present disclosure.

In one embodiment, as shown in FIG. 7, the arm assemblies 30 is configured to rotate around the rotation axis 12 on the center body 10, and the cross bars 32 are arranged non-parallel to the corresponding rotation axis 12, such that the relative state between the two cross bars 32 changes when the arm assemblies 30 rotate, thereby realizing the deformation of the aerial vehicle. For example, in one embodiment, at the first height position, the two cross bars 32 may be in a parallel state; and, at the second height position, the two cross bars 32 may be in a V-shaped state. Or, in another embodiment, at the first height position, the two cross bars 32 may be in a V-shaped state; and, at the second height position, the two cross bars 32 may be in a parallel state. Or, in yet another embodiment, at the first height position, the two cross bars 32 may be in a V-shaped state; and, at the second height position, the two cross bars 32 may be also in a V-shaped state. FIG. 7 illustrates the rotation trajectory of the cross bars 32 at the first height position and the second height position.

In one embodiment, the perpendicular distance L1 from the first ends of the cross bars 32 to the corresponding rotation axis 12 may be larger than the perpendicular distance L2 from the second ends to the corresponding rotation axis 12. As shown in FIG. 7, when the cross bars 32 rotate between the first height position and the second height position, since the distance from the first ends (which may be understood as the front ends in this embodiment) closer to the load assembly 20 to the rotation axis 12 is larger than the distance from the second ends (which can be understood as the rear ends in this embodiment) away from the load assembly 20 to the rotation axis 12, when the cross bars 32 rotate around the rotation axis 12, the curvature radius of the rotation trajectory of the front ends of the cross bars 32 may be larger than the curvature radius of the rotation trajectory of the rear ends, and the curvature of the rotation trajectory of the front ends may be less than the curvature of the rotation trajectory of the rear ends. Therefore, the bending degree of the rear ends may be larger than the bending degree of the front ends. Therefore, when the cross bars 32 rotate to the second height position, the rear ends may be more curved and closer to the center body 10 than the front ends, presenting an effect of the front end opening and the rear end closing. In addition, at this time, the spacing between the front ends of the two cross bars 32 may be larger than the spacing at the first height position. Further, when the arm assemblies 30 rotate at a certain angle, the rotation stroke of the front ends of the cross bars 32 may be larger than the rotation stroke of the rear ends, such that the cross bars 32 have a certain tilt angle in the pitch direction relative to the center body 10.

In the present disclosure, the deformation of the arm assemblies 30 may be achieved only by the driver mechanism 11 in the process of driving the arm assemblies 30 to rotate upward/downward. That is, at the second height position (that is, the arm assemblies 30 are at the bottom), the two cross bars 32 may be in a V shape but separated from each other. The effect of the center body 10 tilting upward/downward may also be achieved at the second height position. The structural design is ingenious, the structure is simple, and the reliability is high.

In one embodiment, as shown in FIG. 5, the rotation axis 12 may be tilted relative to the pitch axis, the yaw axis, and the roll axis of the power device 70, such that the arm assemblies 30 also have a rotation component around the yaw axis direction and a rotation component around the pitch axis direction during the upward/downward rotation. Further, the rotation axis 12 may be tilted toward the outer side of the center body 10 and the upper side of the center body 10 along the direction away from the load assembly 20, such that the perpendicular distance from the front end of the cross bar 32 to the rotation axis 12 is larger than the perpendicular distance from the rear end of the cross bar 32 to the rotation axis 12.

In some other embodiments, another driver mechanism may be added, and the another driver mechanism may be configured to drive the arm assemblies 30 to rotate around the yaw axis of the power device 70 during the process of the driver mechanism 11 driving the arm assemblies 30 to rotate, such that the spacing (lateral spacing) between the cross bars 32 and the load assembly 20 in the pitch axis direction changes. Alternatively, in some other embodiments, another driver mechanism may be added, and the another driver mechanism may be configured to drive the center body 10 to rotate around the pitch axis of the power device 70 during the process of the driver mechanism 11 driving the arm assemblies 30 to rotate, such that the longitudinal axis of the center body 10 is parallel to or inclined relative to the roll axis of the power device 70.

In one embodiment, the aerial vehicle further includes a controller 80 for controlling the attitude of the aerial vehicle, and the controller 80 may be configured to be able to adjust the attitude of the aerial vehicle during the rotation of the arm assemblies 30. The controller 80 may adjust the attitude of the aerial vehicle by controlling each propeller 73. Since the angle of the propeller plane (the plane formed by the connection of the center points of the rotating shafts of each rotor power assembly) of the power device 70 changes during the process of the driver mechanism 11 driving the arm assemblies 30 to rotate up and down, the flight attitude of the aerial vehicle may be affected. For example, when the arm assemblies 30 are downward, there may be an angle between the propeller plane and the vertical direction, and the propeller plane may tilt forward, causing the aerial vehicle to suddenly fly forward and continue to accelerate, or causing the aerial vehicle to resume hovering after a certain period of time and remain near the previous hovering point. The above situations may affect flight safety and flight experience. Therefore, the controller 80 may need to adjust the angle of the propeller plane in real time to control the attitude of the aerial vehicle. That is, during the deformation of the arm assemblies 30, after the propeller plane changes for a certain angle, the controller 80 may control the rotation speed of each rotor power assembly propeller 73 to adjust the propeller plane, thereby compensating for the change of the propeller plane caused by the deformation of the arm assemblies 30. Therefore, the propeller plane may be finally located at the angle controlled by the user, such as the angle of hovering parallel to the horizontal plane, or a certain forward tilt angle in forward flight, etc. It can be seen from the above that the deformation movement of the arm assemblies 30 may be the superposition of the two movements of the driver mechanism 11 driving the arm assembly 30 to rotate upward/downward and the controller 80 controlling the propeller plane to make the attitude of the aerial vehicle change. When the arm assemblies 30 are not deformed, the flight attitude of the aerial vehicle may be also controlled by the controller 80, or another controller may be set to control the flight attitude of the aerial vehicle.

Further, the aerial vehicle may also include a detector 90, which is electrically connected to the controller 80. The detector 90 may be configured to detect the angle information between the longitudinal axis of the center body 10 and the roll axis of the power device 70, and the controller 80 may be configured to receive the angle information in real time to adjust the attitude of the aerial vehicle.

Figure 11:
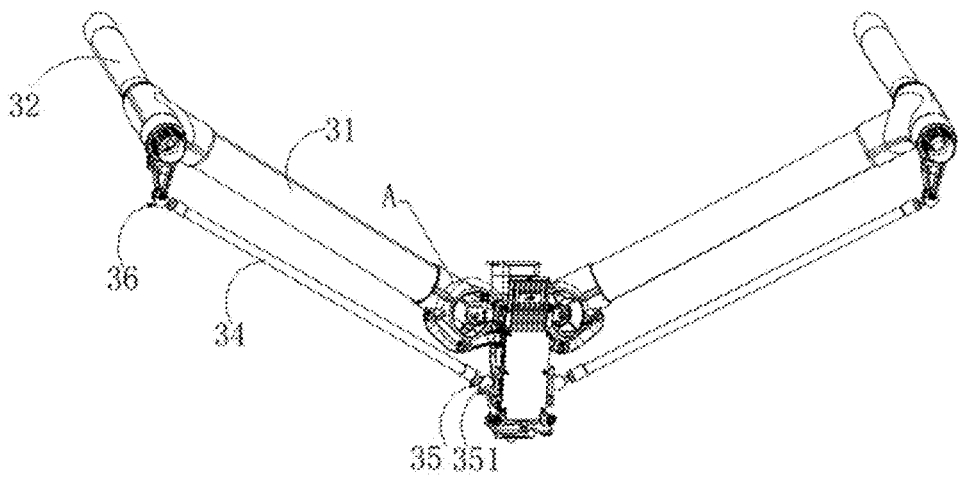
FIG. 11 is a schematic structural diagram of an arm assembly consistent with embodiments of the present disclosure.
Figure 12:
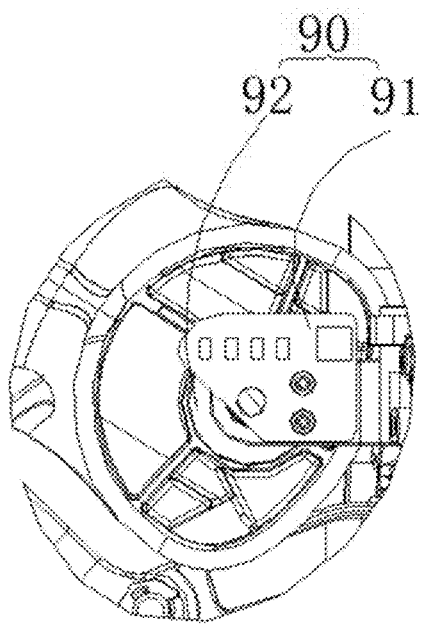
FIG. 12 is a partially enlarged view of a part A of FIG. 11.

In one embodiment, as shown in FIG. 11 and FIG. 12, the detector 90 includes a Hall sensor. The Hall sensor includes a magnetic ring 92 and a Hall plate 91 cooperating with each other. The magnetic ring 92 may be arranged at the arm assemblies 30 and may be configured to rotate synchronously with the arm assemblies 30, and the Hall plate 91 may be arranged at the center body 10. The Hall sensor may be used to detect the rotation angle of the arm assemblies 30, to obtain the angle between the longitudinal axis of the center body 10 and the roll axis of the power device 70. The Hall sensor may have high detection accuracy and good reliability.

In other embodiments, the detector 90 may further include a first inertial measurement unit provided on the center body 10 and a second inertial measurement unit provided on the arm assemblies 30, and the controller 80 may be configured to compare the detection results of the first inertial measurement unit and the second inertial measurement unit, to obtain the angle information between the longitudinal axis of the center body 10 and the roll axis of the power device 70.

In another embodiment, the number of turns of a steering gear 111 may also be determined, thereby determining the spacing of a screw bar 112, and then determining the rotation angle of the nut-connection bar mechanism 113. As shown in FIG. 10, the driver mechanism 11 includes a steering gear 111, a screw bar 112, and a nut-connection bar mechanism 113. The nut-connection bar mechanism 113 may be threadedly matched with the screw bar 112 and connected to the connection bar 31. The steering gear 111 may be configured to drive the screw bar 112 to rotate. The screw bar 112 may rotate to drive the nut-connection bar mechanism 113 to reciprocate along the axial direction of the screw bar 112, and then drive the arm assemblies 30 to rotate. The detector 90 may be configured to detect the number of turns of the steering gear 111, to obtain the angle information between the longitudinal axis of the center body 10 and the roll axis of the power device 70. The detector 90 at this time may be a detector 90 built into the steering gear, or may also be a detector 90 outside the steering gear. In addition, the driver mechanism 11 of the present disclosure may be specifically designed with reference to the existing technologies, which will not be repeated here.

In one embodiment, the controller 80 may be also configured to control the movement of the aerial vehicle when the arm assemblies 30 rotate such that the functional modules on the load assembly 20, such as the photographing device 22, remain stationary, thereby ensuring that the picture photographed by the camera remains unchanged. When the user operates the aerial vehicle to make the aerial vehicle fly forward or backward, the load assembly 20 may also move with the center body 10. Only when the user does not operate (also called hitting the stick) the aerial vehicle, the load assembly 20 may be guaranteed to remain stationary.

In another embodiment, the aerial vehicle may include two arm assemblies 30 respectively arranged at two opposite sides of the center body 10. One arm assembly 30 may include a connection bar 31, an auxiliary arm 34, and a cross bar 32. One end of the connection bar 31 may be rotatably connected to the center body 10, and the other end may be connected to the cross bar 32. One end of the auxiliary arm 34 may be rotatably connected to the center body 10 through a first ball joint structure 35, and the other end may be rotatably connected to the cross bar 32 through a second ball joint structure 36. The aerial vehicle may also include: a power device 70 for moving the aerial vehicle, which is arranged at the cross bar 32; and a driver mechanism 11 mechanically coupled to the two arm assemblies 30 and used to drive the two arm assemblies 30 to move relative to the center body 10. The auxiliary arm 34 may be connected by the first ball joint structure 35 and the second ball joint structure 36, such that the arm assembly 30 has a large degree of freedom when rotating. This embodiment may exist alone or in any combination with other embodiments of the present disclosure.

In one embodiment, the first ball joint structure 35 includes a first ball head 351, which is embedded in the center body 10 and rotates on the center body 10.

Figure 13:
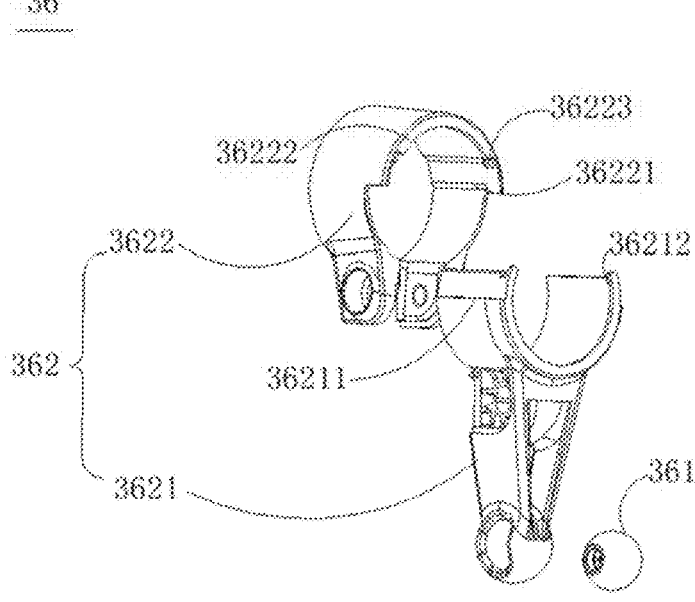
FIG. 13 is an exploded view of a second ball joint structure consistent with embodiments of the present disclosure.

In one embodiment, as shown in FIG. 11 and FIG. 13, the second ball joint structure 36 includes a second ball head 361 and a pull bar connector 362. One end of the pull bar connector 362 may be nested and connected with the second ball head 361, and the other end may be connected to the cross bar 32. The end of the auxiliary arm 34 may be connected to the second ball head 361. Therefore, the connection bar 31, the auxiliary arm 34, the pull bar connector 362, and the corresponding parts of the center body 10 may form a parallelogram or a quasi-parallelogram. The first ball head 351 and the center body 10, and the second ball head 361 and the pull bar connector 362, may be formed by injection molding.

The pull bar connector 362 may include a first assembly 3621 and a second assembly 3622. One end of the first assembly 3621 may be nested and connected with the second ball head 361, and the other end may be connected with the cross bar 32. The second assembly 3622 may be sleeved outside the first assembly 3621 and locked to the cross bar 32 with the first assembly 3621.

Further, the first assembly 3621 may be used to wrap part of the cross bar 32 from one side of the cross bar 32, and the second assembly 3622 may be used to wrap the cross bar 32 from the other side of the cross bar 32 and sleeved outside the first assembly 3621. The first assembly 3621 and the second assembly 3622 may be connected and locked to the cross bar 32 through fasteners. The above-mentioned method of the second assembly 3622 hugging the first assembly 3621 may make the pull bar connector 362 and the cross bar 32 more firmly fixed.

Further, the outer wall of the first assembly 3621 may be provided with a first step member 36211, and the inner wall of the second assembly 3622 may be provided with a second step member 36221. The first step member 36211 and the second step member 36221 may cooperate to circumferentially limit the first assembly 3621 when the first assembly 3621 is locked.

Further, the second assembly 3622 may be provided with a rib 36222 which is arranged at one end of the second assembly 3622, and the rib 36222 may be used to axially limit the first assembly 3621 when the first assembly 3621 is tightly held.

Further, the rib 36222 may be provided with an insertion member 36223, and the first assembly 3621 may be provided with a slot 36212. When the first assembly 3621 and the second assembly 3622 are locked, the insertion member 36223 may be inserted into the slot 36212. In another embodiment, a slot 36212 may also be provided in the rib 36222, and an insertion member 36223 may be provided in the first assembly 3621.

In one embodiment, the auxiliary arm 34 may be threadedly connected to the first ball joint structure 35; and/or, the auxiliary arm 34 may be threadedly connected to the second ball joint structure 36, such that the auxiliary arm 34 is easy to install. For example, the auxiliary arm 34 may be threadedly connected to the first ball head 351; and/or, the auxiliary arm 34 may be threadedly connected to the second ball head 361. Those skilled in the art may adopt other methods to achieve the fixation of the auxiliary arm 34 and the ball joint structure, such as bonding, welding, etc.

The first ball head 351 and/or the second ball head 361 may be provided with a positioning hole, which is used to cooperate with external tools to position the first ball head 351 or the second ball head 361, such that the auxiliary arm 34 may be disassembled by rotating the auxiliary arm 34. The positioning hole may be a hexagonal hole or another hole.

Figure 14:
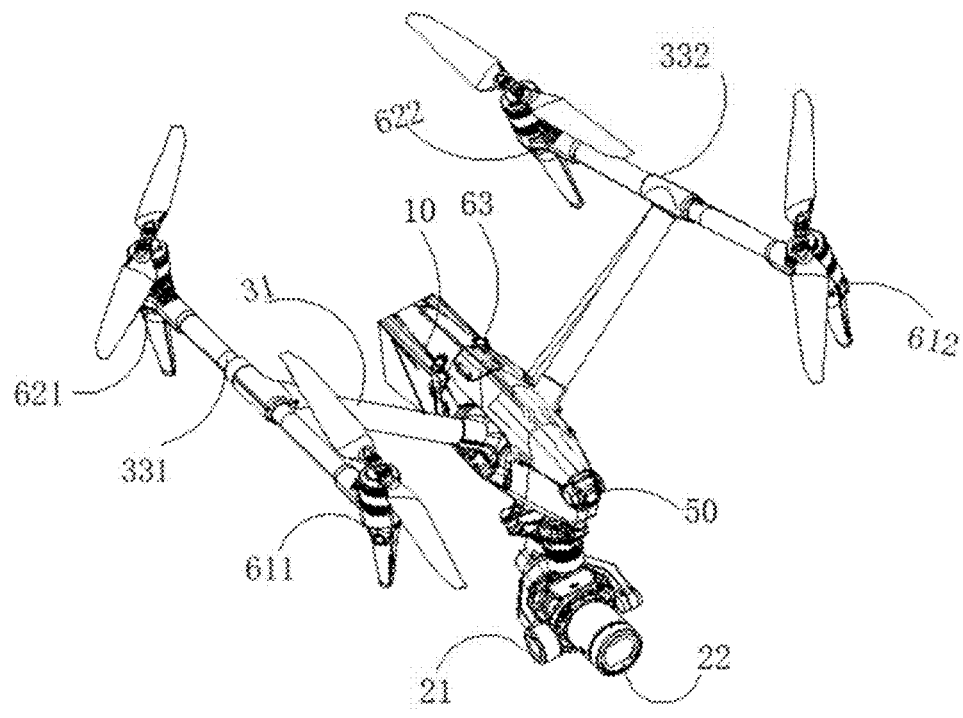
FIG. 14 is a schematic diagram showing the distribution of visual sensors of an aerial vehicle consistent with embodiments of the present disclosure.
Figure 15:
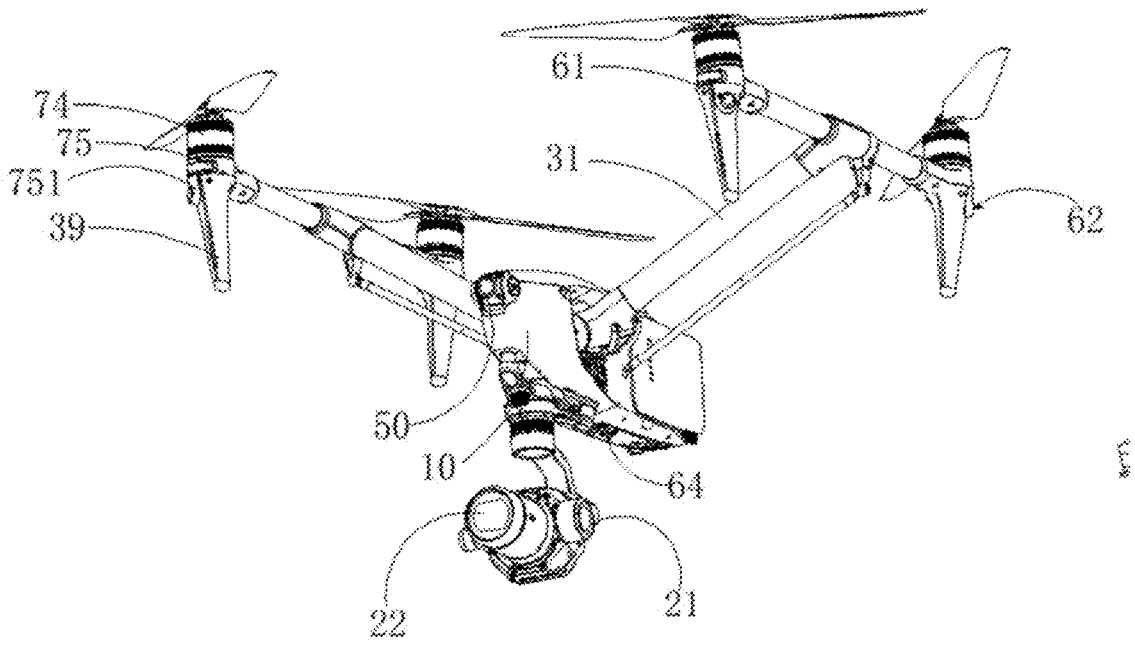
FIG. 15 is another schematic diagram showing the distribution of visual sensors of an aerial vehicle consistent with embodiments of the present disclosure.
Figure 16:
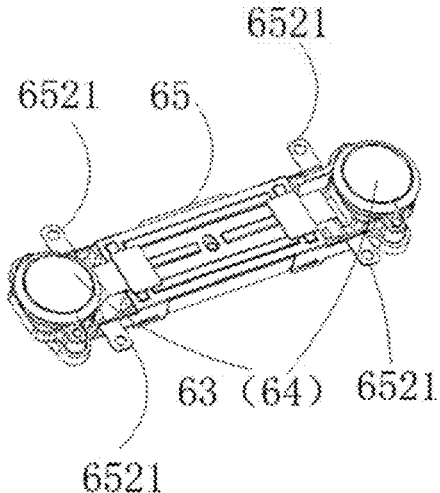
FIG. 16 is a schematic structural diagram of a visual bracket consistent with embodiments of the present disclosure.
Figure 17:
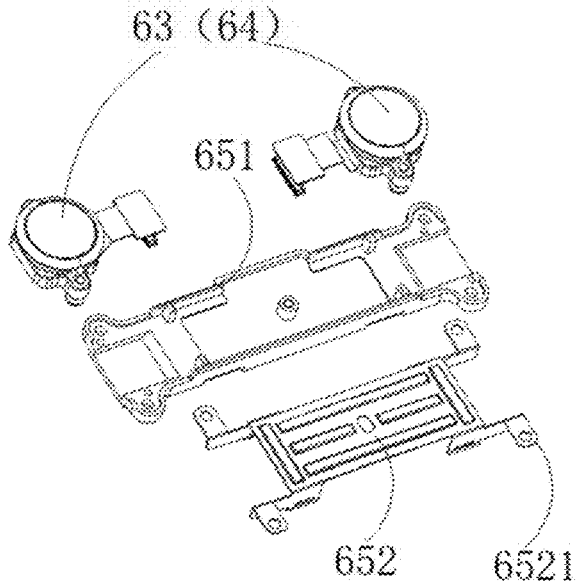
FIG. 17 is an exploded view of a visual bracket shown in FIG. 16.

In another embodiment shown in FIG. 14 and FIG. 15, the aerial vehicle includes: a center body 10; arm assemblies 30 respectively arranged at two opposite sides of the center body 10; a power device 70, which is arranged at the arm assemblies 30 on two sides; a driver mechanism 11, which is mechanically coupled with the two arm assemblies 30 and is used to drive the two arm assemblies 30 to move relative to the center body 10; and an obstacle avoidance device. The obstacle avoidance device may include a first visual sensor and a second visual sensor.

The arm assemblies 30 on the two sides of the center body 10 may respectively be the first arm assembly 331 and the second arm assembly 332. The first visual sensor may be arranged at the first arm assembly 331 or arranged at the power device on the first arm assembly 331, and the second visual sensor may be arranged at the second arm assembly 332 or arranged at the power device on the second arm assembly 332. The first visual sensor and the second visual sensor may cooperate to form a binocular structure. By arranging the visual sensors at the arm assemblies 30 or the power device 70, the space of the arm assemblies 30 or the power device 70 may be fully utilized, and the occupation of the center body 10 may be reduced. Furthermore, by arranging the visual sensors at the arm assemblies 30 or the power device 70, as the arm assemblies 30 are deformed, the baseline of the binocular structure may be also increased, such that the visual sensors are able to observe farther. This embodiment can exist alone or in combination with other embodiments of the present disclosure. Those skilled in the art can make corresponding combinations according to actual needs.

As shown in FIG. 14, in one embodiment, the first visual sensor includes a first front visual sensor 611 corresponding to the front end of the first arm assembly 331, and the second visual sensor includes a second front visual sensor 612 corresponding to the front end of the second arm assembly 332, where the first front visual sensor 611 and the second front visual sensor 612 form a first binocular 61. Additionally or alternatively, the first visual sensor includes a first rear visual sensor 621 corresponding to the rear end of the first arm assembly 331, and the second visual sensor includes a second rear visual sensor 622 corresponding to the rear end of the second arm assembly 332, where the first rear visual sensor 621 and the second rear visual sensor 622 form a second binocular 62. The first binocular 61 and the second binocular 62 do not necessarily exist at the same time. The first visual sensor may include only the first front visual sensor 611, or only the first rear visual sensor 621, or may include both the first front visual sensor 611 and the first rear visual sensor 621. The second visual sensor may include only the second front visual sensor 612, or only the second rear visual sensor 622, or may include both the second front visual sensor 612 and the second rear visual sensor 622.

In one embodiment, the FOV of the first binocular 61 may cover the front and outside of the center body 10; and/or, the FOV of the second binocular 62 may cover the rear and outside of the center body 10. The first binocular 61 and the second binocular 62 may achieve obstacle avoidance functions in the front, rear, left, and right directions, providing the aerial vehicle with horizontal omnidirectional perception capabilities.

In one embodiment, each first rotor power assembly 71 or each second rotor power assembly 72 may include a propeller 73 and a power source for driving the propeller 73 to rotate. The first visual sensor and the second visual sensor may be respectively arranged at the power source of the corresponding rotor power assembly.

For example, as shown in FIG. 10 and FIG. 15, the power source includes a motor 74 for driving the propeller 73 to rotate and a motor seat 75 for installing the motor 74. The motor seat 75 may be arranged at the corresponding arm assembly 30, and the first visual sensor and the second visual sensor may be respectively arranged at the corresponding motor seat 75, that is, each visual sensor may be arranged at one corresponding motor seat 75. The motor seat 75 may be made of metal and may have good anti-deformation ability. By arranging the visual sensors at the motor seats 75, the reliability of the visual sensors may be improved. The visual sensors may also be arranged at the corresponding motors 74. For example, the outer shells of the motors 74 may also have good anti-deformation ability.

In another embodiment, as shown in FIG. 15, each arm assembly 30 further includes a leg 39, and the leg 39 may be connected to the lower side of the corresponding motor seat 75. The motor seat 75 may have an installation member 751 extending in the direction of the leg 39. The first visual sensor and the second visual sensor may be respectively arranged at the corresponding installation members 751, that is, each visual sensor may be arranged at one corresponding installation member 751, which may increase the distance between the propellers 73 and reduce or eliminate the interference of the propellers 73 on the visual sensors. The installation member 751 may be connected to the corresponding leg 39; or, the leg 39 may surround the corresponding installation member 751 and may be adjacent to the installation member 751. That is, the leg 39 may be provided with a recess, and the installation member 751 may extend into the recess. Each visual sensor may be arranged at any position of the corresponding arm assembly 30 in various embodiments.

In one embodiment shown in FIG. 14 and FIG. 15, the obstacle avoidance device further includes a third binocular 63 located at the top of the center body 10 and/or a fourth binocular 64 located at the bottom of the center body 10. Therefore, the obstacle avoidance functions in the upward and downward directions may be realized.

The third binocular 63 and/or the fourth binocular 64 may be installed at the center body 10 through a visual bracket 65, and the visual bracket 65 may be provided with a cantilever structure 6521 connected to the center body 10 to fix the third binocular 63 and/or the fourth binocular 64 to the center body 10. Further, the cantilever structure 6521 may be provided with a connection hole, and the connection hole may be used to cooperate with a fastener to fix the third binocular 63 and/or the fourth binocular 64 to the center body 10. By setting the integrated cantilever structure 6521 at the visual bracket 65, when the third binocular 63 and/or the fourth binocular 64 are installed at the center body 10, the force release effect may be achieved, such that the visual bracket 65 is evenly stressed. Also, the cantilever structure 6521 may have a certain height, may not be easy to deform, and may achieve effective positioning, and may improve assembly efficiency.

In one embodiment, the visual bracket 65 may include a fixation frame 651 of the visual sensors and a press member 652 (which can be a sheet metal part) for fixing a connector (the connector is used to connect the visual sensors to the core board 13), and the press member 652 or the fixation frame 651 may be provided with the cantilever structure 6521.

Figure 18:
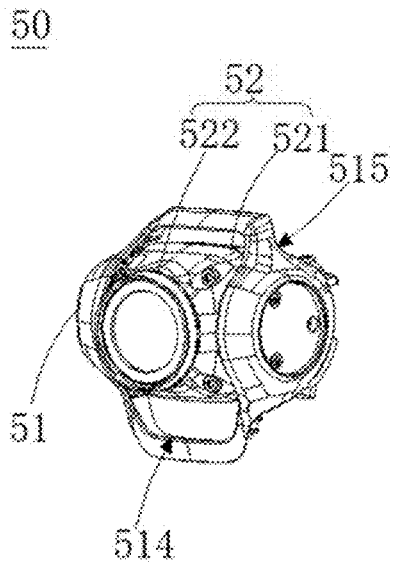
FIG. 18 is a schematic structural diagram of an FPV photographing assembly consistent with embodiments of the present disclosure.
Figure 21:
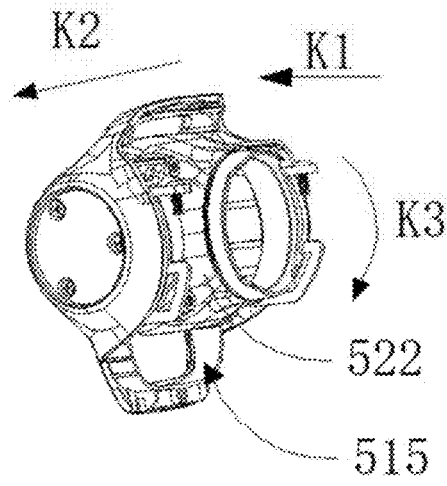
FIG. 21 is a schematic assembly diagram of the FPV photographing assembly shown in FIG. 18.

In one embodiment shown in FIG. 15, FIG. 18 and FIG. 21, the aerial vehicle further includes a first person view (FPV) photographing assembly 50 arranged at the center body 10. When the load assembly 20 is a camera photographing assembly, when the camera photographing assembly photographs toward one side of the center body 10, the FPV photographing assembly 50 may be configured to photograph the other side of the center body 10. For example, when the camera photographing assembly photographs the rear of the center body 10, the front of the center body 10 may be photographed through the FPV device 52, to facilitate the user to judge the front flight environment and control the aerial vehicle, and to improve the flight safety performance.

In one embodiment, the FPV photographing assembly 50 may include an installation bracket 51, an FPV device 52, and a driver element 53. One end of the FPV device 52 may be provided with a shaft end 523, and the other end may be connected to the driver element 53. The driver element 53 may be used to drive the FPV device 52 to rotate. The installation bracket 51 may be provided with a first end 511 and a second end 512. The first end 511 may be used to install the driver element 53, and the second end 512 may be used to install the shaft end 523. The installation bracket 51 may be an integral part, which may be used to ensure the two ends of the FPV device 52 are coaxial and to avoid affecting the accuracy of the two ends of the FPV device 52 because of assembly errors, such that the rotation adjustment of the FPV device 52 is more accurate. In one embodiment, the driver element 53 may be a motor. In some other embodiments, the driver element 53 may also be a driver structure such as a pulsator or a crank. The FPV device of the present embodiment may exist alone or attached to the aerial vehicle.

In one embodiment, the FPV device 52 may be configured to rotate around the pitch axis of the power device 70, that is, the driver element 53 may be used to drive the FPV device 52 to rotate around the pitch axis of the power device 70. In some other embodiments, the FPV device 52 may also be set to rotate around the yaw axis or roll axis of the power device 70 according to actual needs. In one embodiment, the FPV photographing assembly 50 may include the FPV device 52, such that the user has a first-person perspective. In some other embodiments, the FPV device 52 may also be replaced by another camera device.

The installation bracket 51 may be provided with an accommodation cavity between the first end 511 and the second end 512. The first end 511 may be provided with a driver installation groove 5111 for accommodating at least part of the driver element 53, and the second end 512 may be provided with an installation hole 5121 for cooperating with the shaft end 523 and a guide inlet 5122 located in the radial direction of the installation hole 5121. When the FPV device 52 is loaded into the accommodation cavity, the shaft end 523 may be inserted into the installation hole 5121 along the guide inlet 5122. The driver element 53 may be located outside the driver installation groove 5111 and directly facing the driver installation groove 5111. When the FPV device 52 is moved in the direction of the driver installation groove 5111, the driver element 53 may at least partially enter the driver installation groove 5111, and the shaft end 523 may be rotatably fixed to the installation hole 5121. The above design may facilitate the installation of the FPV device 52 into the integral installation bracket 51.

The shaft end 523 may be fixed to the second end 512 through a bearing 54, thereby reducing the friction force when the shaft end 523 rotates, such that the FPV device 52 rotates more smoothly to adjust the photographing angle.

As shown in FIG. 18, in one embodiment, the FPV device 52 includes a main body 521 and a protrusion 522 arranged at the main body 521. The installation bracket 51 may be provided with a first opening 514 facing the outside of the center body 10 and a second opening 515 opposite to the first opening 514. The size of the first opening 514 along the rotation axis direction of the driver element 53 may be adapted to the size of the protrusion 522 along the rotation axis direction of the driver element 53. The size of the first opening 514 in the direction perpendicular to the rotation axis direction of the driver element 53 may be larger than the vertical size of the protrusion 522, such that the FPV device 52 is able to rotate in the first opening 514. The FPV device 52 may be configured to be able to be loaded into the accommodation cavity from the second opening 515, and to be able to be loaded into the installation bracket 51 in the direction of the arrow K1 shown in FIG. 21. The protrusion 522 may extend out of the first opening 514.

When the FPV device 52 is inserted into the installation bracket 51, the protrusion 522 may face away from the first opening 514, as shown in FIG. 21. When the driver element

53 is located in the driving mounting groove 5111, that is, after the FPV device 52 is inserted into the installation bracket 51 in the K1 direction, the FPV device 52 may be moved in the K2 direction such that the driver element 53 is located in the driving mounting groove 5111. And then, the protrusion 522 may be rotated in the K3 direction such that the protrusion 522 is rotated out of the first opening 514. When the FPV device 52 is installed in place, the two sides of the protrusion 522 may be in contact with the first end 511 and the second end 512 respectively. When the FPV device 52 is to be disassembled, the FPV device 52 may not be able to move axially because of the restrictions of the first end 511 and the second end 512 on two sides. The FPV device 52 may need to rotate to the direction where the protrusion 522 faces the second opening 515. At this time, when the FPV device 52 is moved axially, the protrusion 522 may not be restricted and the FPV device 52 may be disassembled. Similarly, when installing the FPV device 52, it may also be necessary to insert the FPV device 52 when the protrusion 522 is facing away from the first opening 514 (along the direction of the second opening), and then rotate the FPV device 52 after the driver element 53 is in place, such that the protrusion 522 is rotated out of the first opening.

Figure 19:
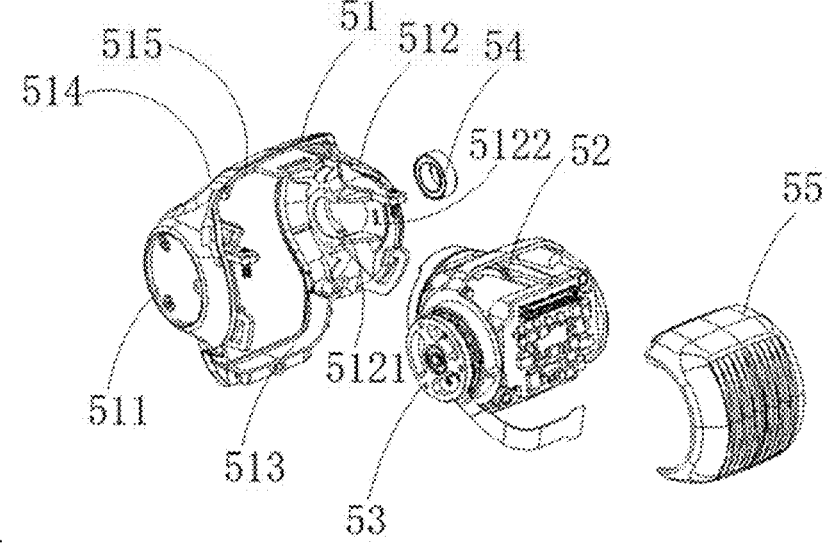
FIG. 19 is an exploded view of the FPV photographing assembly shown in FIG. 18.
Figure 20:
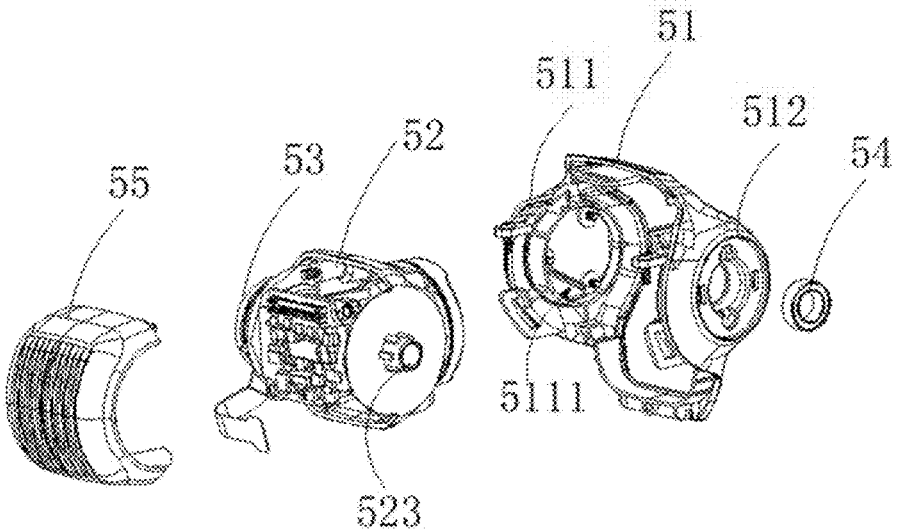
FIG. 20 is another exploded view of the FPV photographing assembly shown in FIG. 18.

In one embodiment shown in FIG. 19 and FIG. 20, which are exploded views of the FPV photographing assembly from two different directions, the FPV photographing assembly 50 also includes a cover 55 used to close the second opening 515 after the FPV device 52 is installed in place.

In one embodiment, the load assembly 20 may be located on the lower side of the center body 10, and the FPV photographing assembly 50 may be located on the upper side of the center body 10. When the FPV photographing assembly 50 shoots downward, the FOV of the FPV device 52 may be staggered or only partially overlapped with the load assembly 20, thereby reducing or eliminating the obstruction of the FPV photographing assembly 50 by the load assembly 20.

In one embodiment, the center body 10 may be provided with an accommodation port 15. As shown in FIG. 10, the accommodation port 15 may be located at the nose of the center body 10. The FPV photographing assembly 50 may be installed in the accommodation port 15, the installation bracket 51 may be docked with the side wall around the accommodation port 15, and the installation bracket 51 may be flush with or smoothly transitioned with the side wall around the accommodation port 15. The FPV photographing assembly 50 may be loaded into the accommodation port 15, the structure may be compact, and the aerial vehicle may have a better appearance.

Figure 22:
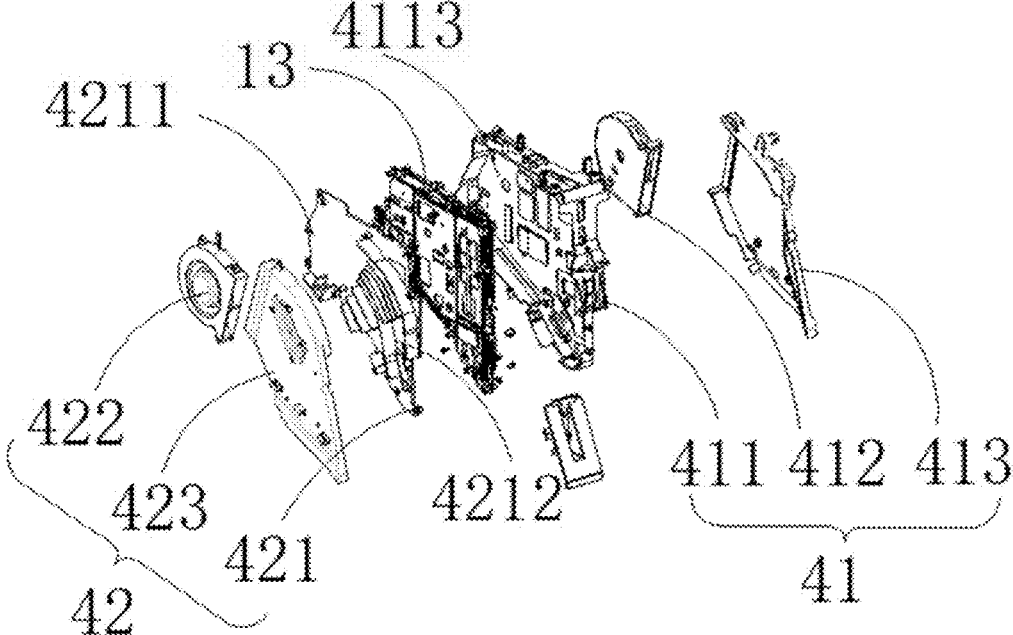
FIG. 22 is an exploded view of a heat dissipation device consistent with embodiments of the present disclosure.
Figure 23:
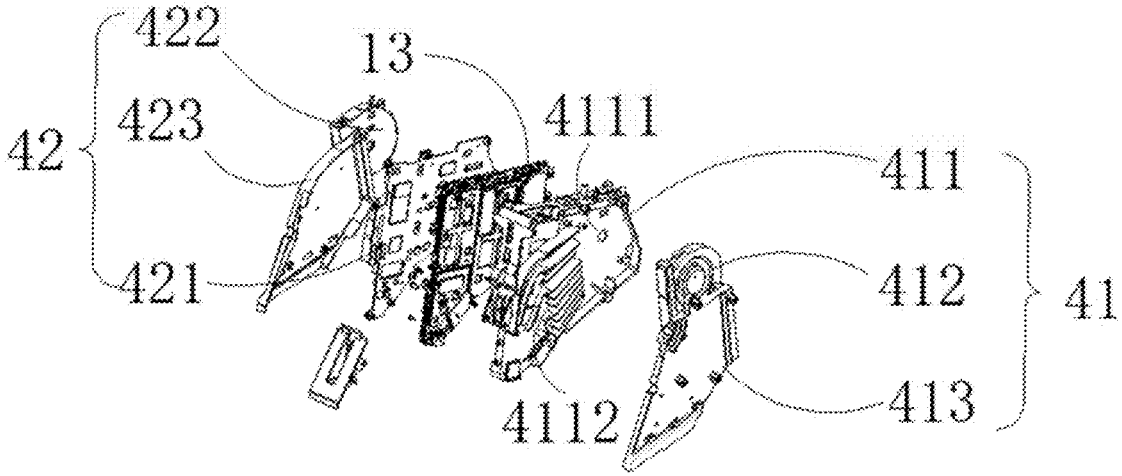
FIG. 23 is another exploded view of a heat dissipation device consistent with embodiments of the present disclosure.

In one embodiment, the aerial vehicle further includes a heat dissipation device 40 on the center body 10, as shown in FIG. 10 and FIG. 22 to FIG. 27 (FIG. 22 and FIG. 23 are exploded views of the heat dissipation device 40 from two different directions). The heat dissipation device 40 may include a first heat dissipation structure 41 and a second heat dissipation structure 42. The first heat dissipation structure 41 may be configured to dissipate heat on one side of the core board 13 of the center body 10, and the second heat dissipation structure 42 may be used to dissipate heat on the other side of the core board 13. By dissipating heat on two sides of the core board 13 through the first heat dissipation structure 41 and the second heat dissipation structure 42, the heat of the electronic components on two sides of the core board 13 may be effectively taken away, thereby improving the heat dissipation efficiency.

Further, a cavity 4113 for accommodating the core board 13 may be formed between the first heat dissipation structure 41 and the second heat dissipation structure 42, and the core board 13 may be sandwiched therein, which may effectively improve the heat dissipation efficiency and make the structure compact.

In one embodiment, the first heat dissipation structure 41 may be provided with the cavity 4113, the core board 13 may be arranged in the cavity 4113, and the second heat dissipation structure 42 may be arranged in the cavity 4113 and cover the core board 13.

Figure 24:
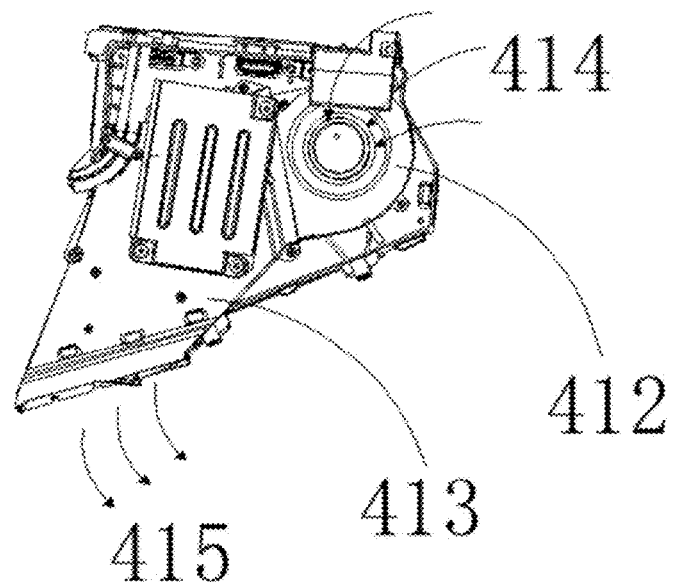
FIG. 24 is a schematic structural diagram of a first heat dissipation structure of the heat dissipation device shown in FIG. 22 and FIG. 23.
Figure 25:
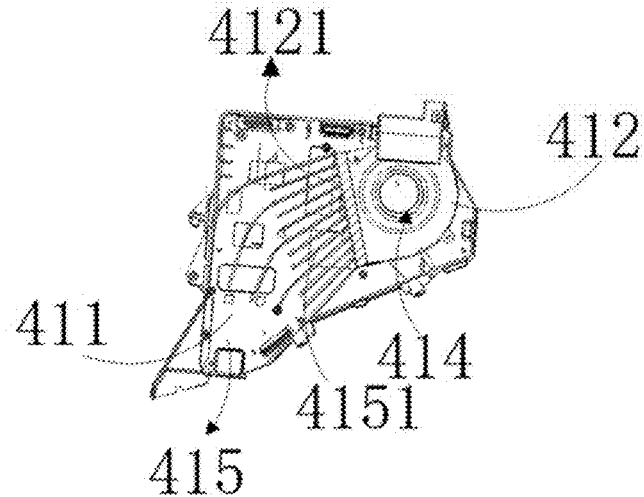
FIG. 25 is a schematic structural diagram of the first heat dissipation structure (without a first cover) shown in FIG. 24.

In one embodiment, as shown in FIG. 24 and FIG. 25, the first heat dissipation structure 41 may include a first fan 412 and a first air outlet duct 415. The air inlet of the first fan 412 may be connected to the air inlet 14 located at the center body 10 to form the first air inlet duct 414. The air outlet 4121 of the first fan may be connected to the first air outlet duct 415, and the first air inlet duct 414 may be isolated from the first air outlet duct 415. And/or, as shown in FIG. 26 and FIG. 27, the second heat dissipation structure 42 may include a second fan 422 and a second air outlet duct 425. The air inlet of the second fan 422 may be connected to the air inlet 14 located at the center body 10 to form the second air inlet duct 424, the air outlet 4221 of the second fan may be connected to the second air outlet duct 425, and the second air inlet duct 424 and the second air outlet duct 425 may be isolated.

In one embodiment shown in FIG. 10, the air outlet directions of the first air outlet duct 415 and the second air outlet duct 425 may deviate from the load assembly 20 to prevent the exported hot air from blowing toward the load assembly 20.

The air outlet (not shown in the drawings) of the first air outlet duct 415 and the air outlet 4255 of the second air outlet duct 425 may both be arranged toward the bottom of the center body 10, to export the hot air flow from the bottom of the center body 10.

In one embodiment shown in FIG. 22 and FIG. 2, the first heat dissipation structure 41 further includes a first bracket 411 and a first cover plate 413. The first bracket 411 may include a first area 4111 and a second area 4112 on the side facing away from the core board 13. The first fan 412 may be arranged in the first area 4111, and the first cover plate 413 may be arranged at the second area 4112 to cooperate to form the first air outlet duct 415. And/or, the second heat dissipation structure 42 may further include a second bracket 421 and a second cover plate 423. The second bracket 421 may include a third area 4211 and a fourth area 4212 on the side facing away from the core board 13. The second fan 422 may be arranged in the third area 4211, and the second cover plate 423 may be arranged in the fourth area 4212 to cooperate to form the second air outlet duct 425.

The first air outlet duct 415 may be provided with a first heat dissipation rib 4151; the second air outlet duct 425 may be provided with a second heat dissipation rib 4251, which may be conducive to improving the heat dissipation efficiency.

Various embodiments have been described to illustrate the operation principles and exemplary implementations. Those skilled in the art would understand that the present disclosure is not limited to the specific embodiments described herein and there can be various other changes, rearrangements, and substitutions. Thus, while the present disclosure has been described in detail with reference to the above described embodiments, the present disclosure is not limited to the above described embodiments, but may be embodied in other equivalent forms without departing from the spirit and scope of the present disclosure.

What is claimed is:

1. An aerial vehicle comprising:
   a center body;
   two arm assemblies arranged at two opposite sides of the center body, respectively, each of the two arm assemblies including a proximal part and a distal part, and the proximal part being closer to the center body than the distal part;
   a power device including:
      two first rotor power assemblies each installed at one end of one of the two arm assemblies; and
      two second rotor power assemblies each installed at another end of one of the two arm assemblies;
   a driver mechanism mechanically coupled to the two arm assemblies and configured to drive the two arm assemblies to move relative to the center body to move the distal parts of the two arm assemblies between a first height position and a second height position different from the first height position;
   wherein:
      in a direction of a roll axis of the power device, the two first rotor power assemblies are closer to an installation site on the center body for installation of a load assembly than the two second rotor power assemblies;
      the two arm assemblies are configured such that when the distal parts of the two arm assemblies are at the second height position, a spacing between the two first rotor power assemblies is larger than a spacing between the two second rotor power assemblies; and
      the two arm assemblies are configured such that when the distal parts of the two arm assemblies are at the first height position, the spacing between the first rotor power assemblies is equal to the spacing between the second rotor power assemblies.

2. The aerial vehicle according to claim 1, wherein the center body and the power device are configured such that during rotation of the two arm assemblies, an angle between a longitudinal axis of the center body and the roll axis of the power device changes.

3. The aerial vehicle according to claim 2, wherein the center body and the power device are configured such that when the distal parts of the two arm assemblies are at the second height position, the longitudinal axis of the center body is inclined relative to the roll axis of the power device, and a first end of the center body for connecting the load assembly is higher than a second end of the center body opposite to the first end of the center body.

4. The aerial vehicle according to claim 2, wherein the center body and the power device are configured such that when the distal parts of the two arm assemblies are at the first height position, the longitudinal axis of the center body is inclined relative to the roll axis of the power device, and a first end of the center body for connecting the load assembly is lower than a second end of the center body opposite to the first end of the center body.

5. The aerial vehicle according to claim 2, wherein the center body and the power device are configured such that when the distal part is at the first height position, the longitudinal axis of the center body is parallel or approximately parallel to the roll axis of the power device.

6. The aerial vehicle according to claim 1, wherein:
   each of the two arm assemblies includes:
      a cross bar; and a connection bar, one end of the connection bar being rotatably connected to the center body and another end of the connection bar being connected to the cross bar;

each of the two first rotor power assemblies is arranged at a first end of the cross bar of a corresponding arm assembly of the two arm assemblies or closer to the first end of the cross bar of the corresponding arm assembly of the two arm assemblies than a second end of the cross bar of the corresponding arm assembly, the second end being opposite to the first end; and the two arm assemblies are configured such that a spacing between the first ends of the cross bars of the two arm assemblies when the distal parts of the two arm assemblies are at the first height position is smaller than the spacing between the first ends of the cross bars of the two arm assemblies when the distal parts of the two arm assemblies are at the second height position.

7. The aerial vehicle according to claim 6, wherein the two arm assemblies are configured such that when the distal parts are at the second height position, the spacing between the first ends of the cross bars is larger than a spacing between the second ends of the cross bars.

8. The aerial vehicle according to claim 6, wherein the two arm assemblies are configured such that when the distal parts are at the first height position, the cross bars of the two arm assemblies are parallel or approximately parallel to each other.

9. The aerial vehicle according to claim 6, wherein the two arm assemblies are configured such that when the distal parts are at the second height position, a longitudinal axis of the center body is inclined relative to a plane formed by the cross bars of the two arm assemblies, and a first end of the center body for connecting the load assembly is higher than a second end of the center body opposite to the first end of the center body.

10. The aerial vehicle according to claim 6, wherein the two arm assemblies are configured such that when the distal parts are at the first height position, a longitudinal axis of the center body is parallel or approximately parallel to the cross bar of one of the two arm assemblies.

11. The aerial vehicle according to claim 6, wherein the two arm assemblies are configured to rotate around a rotation axis on the center body, and the cross bars of the two arm assemblies are non-parallel to the rotation axis.

12. The aerial vehicle according to claim 11, wherein a perpendicular distance from the first end of one cross bar of the cross bars to the rotation axis is greater than a perpendicular distance from the second end of the one cross bar to the rotation axis.

13. The aerial vehicle according to claim 1, wherein in a direction of a yaw axis of the power device, the distal parts of the two arm assemblies at the second height position are closer to the installation site than the distal parts of the two arm assemblies at the first height position.

14. The aerial vehicle according to claim 1, wherein the installation site is at a lower side of the center body.

15. The aerial vehicle according to claim 1, wherein:

the first height position is an upper position with respect to the center body; and the second height position is a lower position with respect to the center body.

16. The aerial vehicle according to claim 1, wherein the installation site is arranged at a front end of the center body.

17. The aerial vehicle according to claim 1, further comprising:

a first person view (FPV) photographing assembly installed at the center body and including:

an installation bracket as an integral part;

an FPV device, one end of the FPV device being provided with a shaft end installed at one end of the installation bracket; and a driver element installed at another end of the installation bracket and connected to another end of the FPV device, the driver element being configured to drive the FPV device to rotate.

18. The aerial vehicle according to claim 1, further comprising:

an obstacle avoidance device including:

a first visual sensor arranged at a first arm assembly of the two arm assemblies or at one of the first rotor power assembly or the second rotor power assembly that are arranged at the first arm assembly; and a second visual sensor arranged at a second arm assembly of the two arm assemblies or at one of the first rotor power assembly or the second rotor power assembly that are arranged at the second arm assembly.

19. The aerial vehicle according to claim 18, wherein:

the first visual sensor includes a first front visual sensor corresponding to a front end of the first arm assembly, and the second visual sensor includes a second front visual sensor corresponding to a front end of the second arm assembly; and/or the first visual sensor includes a first rear visual sensor corresponding to a rear end of the first arm assembly, and the second visual sensor includes a second rear visual sensor corresponding to a rear end of the second arm assembly.

20. An aerial vehicle comprising:

a center body;

two arm assemblies arranged at two opposite sides of the center body, respectively, each of the two arm assemblies including a proximal part and a distal part, and the proximal part being closer to the center body than the distal part;

a power device including:

two first rotor power assemblies each installed at one end of one of the two arm assemblies; and two second rotor power assemblies each installed at another end of one of the two arm assemblies;

a driver mechanism mechanically coupled to the two arm assemblies and configured to drive the two arm assemblies to move relative to the center body to move the distal parts of the two arm assemblies between a first height position and a second height position different from the first height position;

wherein:

in a direction of a roll axis of the power device, the two first rotor power assemblies are closer to an installation site on the center body for installation of a load assembly than the two second rotor power assemblies;

the two arm assemblies are configured such that when the distal parts of the two arm assemblies are at the second height position, a spacing between the two first rotor power assemblies is larger than a spacing between the two second rotor power assemblies; and the center body and the power device are configured such that during rotation of the two arm assemblies, an angle between a longitudinal axis of the center body and the roll axis of the power device changes.

\* \* \* \* \*